US010744852B2

(12) United States Patent
Wakisaka et al.

(10) Patent No.: US 10,744,852 B2
(45) Date of Patent: Aug. 18, 2020

(54) VEHICULAR AIR-CONDITIONING DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Takeshi Wakisaka, Kariya (JP); Kazuya Nishiuma, Kariya (JP); Toshinao Aoki, Kariya (JP); Yoshinori Ichishi, Kariya (JP); Takayuki Shimauchi, Toyota (JP); Makoto Inoue, Toyota (JP); Daisuke Setoguchi, Aichi-gun (JP); Yoshinori Okuno, Okazaki (JP); Tatsuru Tanaka, Okazaki (JP); Kazuaki Shingo, Novi, MI (US)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 26 days.

(21) Appl. No.: 16/075,686

(22) PCT Filed: Dec. 19, 2016

(86) PCT No.: PCT/JP2016/087724
§ 371 (c)(1),
(2) Date: Aug. 6, 2018

(87) PCT Pub. No.: WO2017/138258
PCT Pub. Date: Aug. 17, 2017

(65) Prior Publication Data
US 2019/0039438 A1 Feb. 7, 2019

(30) Foreign Application Priority Data

Feb. 8, 2016 (JP) .................. 2016-022150

(51) Int. Cl.
*B60H 1/12* (2006.01)
*B60H 1/00* (2006.01)
(Continued)

(52) U.S. Cl.
CPC ............. *B60H 1/12* (2013.01); *B60H 1/0073* (2019.05); *B60H 1/00778* (2013.01);
(Continued)

(58) Field of Classification Search
CPC ............ B60H 1/00742; B60H 1/00792; B60H 1/00735; B60H 1/00778; B60H 1/00842;
(Continued)

(56) References Cited

U.S. PATENT DOCUMENTS 5,537,831 A  7/1996 Isaji et al.
2005/0103488 A1* 5/2005 Ichishi ............... B60H 1/00792
165/202

(Continued)

FOREIGN PATENT DOCUMENTS

JP    H04103427 A    4/1992
JP    H07001954 A    1/1995
(Continued)

*Primary Examiner* — Tho V Duong
(74) *Attorney, Agent, or Firm* — Harness, Dickey & Pierce, P.L.C.

(57) ABSTRACT

A vehicular air-conditioning device includes a blowing port mode door as an air volume regulator that regulates volumes of air-conditioning air blown to a driver seat area, a front passenger seat area, and a rear seat area inside a vehicle compartment, and an air-conditioning controller activated by an activation signal outputted from a body controller in response to opening and closing of a rear seat door during a stoppage of a vehicle system. The air-conditioning controller is capable of operating an actuator for driving the blowing port mode door to blow the air-conditioning air to the rear seat area when an activation switch of the vehicle system is (Continued)

turned on in a state where the air-conditioning control unit has been activated by the activation signal.

7 Claims, 11 Drawing Sheets

(51) Int. Cl.
  *B60H 1/34* (2006.01)
  *B60H 1/32* (2006.01)
(52) U.S. Cl.
  CPC ..... *B60H 1/00828* (2013.01); *B60H 1/00842* (2013.01); *B60H 1/34* (2013.01); *B60H 1/00742* (2013.01); *B60H 2001/002* (2013.01); *B60H 2001/3241* (2013.01); *B60H 2001/3245* (2013.01); *B60H 2001/3255* (2013.01)
(58) Field of Classification Search
  CPC .............. B60H 1/3205; B60H 1/00642; B60H 1/00878; B60H 1/34; B60H 1/00828; B60H 1/0073; B60H 2001/3255; B60H 2001/3245; B60H 2001/3241
  See application file for complete search history.

(56) References Cited

U.S. PATENT DOCUMENTS

| | | | |
|---|---|---|---|
| 2005/0267646 A1* | 12/2005 | Ichishi | B60H 1/00742 700/300 |
| 2008/0168766 A1 | 7/2008 | Oomura | |
| 2009/0193821 A1 | 8/2009 | Ozeki et al. | |
| 2014/0027090 A1* | 1/2014 | Morikawa | B60H 1/00828 165/47 |
| 2016/0114650 A1* | 4/2016 | Kwark | B60H 1/00742 |
| 2018/0148007 A1* | 5/2018 | Gage | B60R 16/037 |

FOREIGN PATENT DOCUMENTS

| | | |
|---|---|---|
| JP | 2005349935 A | 12/2005 |
| JP | 2006248306 A | 9/2006 |
| JP | 2007069698 A | 3/2007 |
| JP | 2008174042 A | 7/2008 |
| JP | 2012224199 A | 11/2012 |
| WO | WO-2007046366 A1 | 4/2007 |

\* cited by examiner

VEHICULAR AIR-CONDITIONING DEVICE

CROSS REFERENCE TO RELATED APPLICATIONS

This application is a U.S. National Phase Application under 35 U.S.C. 371 of International Application No. PCT/JP2016/087724 filed on Dec. 19, 2016 and published in Japanese as WO 2017/138258 A1 on Aug. 17, 2017. This application is based on and claims the benefit of priority from Japanese Patent Application No. 2016-022150 filed on Feb. 8, 2016. The entire disclosures of all of the above applications are incorporated herein by reference.

TECHNICAL FIELD

The present disclosure relates to a vehicular air-conditioning device capable of realizing air conditioning of a part of an area inside a vehicle compartment.

BACKGROUND ART

As a conventional technique, Patent Literature 1 discloses a vehicular air-conditioning device capable of realizing air conditioning of a part of an area inside a vehicle compartment (so-called zone air conditioning).

More specifically, in the vehicular air-conditioning device of Patent Literature 1, the seating position of an occupant is detected on the basis of a detection value of a pressure sensor (that is, a seat sensor) which is disposed on a seat on which the occupant is seated. Air conditioning is performed by blowing temperature-regulated air-conditioning air with respect to an area occupied by an occupant. On the other hand, air conditioning is not performed with respect to an area unoccupied by an occupant to achieve energy saving in the entire vehicular air-conditioning device.

PRIOR ART LITERATURE

Patent Literature

Patent Literature 1: JP 2005-349935 A

SUMMARY

In a common vehicle, a seat sensor is disposed on a front passenger seat in order to turn on a warning lamp that urges an occupant to wear a seat belt. However, since a seat sensor is relatively expensive, no seat sensor is disposed on a rear seat. Thus, even if the vehicular air-conditioning device of Patent Literature 1 is applied to a common vehicle, it is not possible to determine whether a rear seat is occupied by an occupant and to realize appropriate air conditioning in a rear seat area.

Further, even if a seat sensor is disposed on a rear seat, it may be impossible for a configuration that detects the seating position of an occupant on the basis of a detection value of the seat sensor to correctly detect the seating position of an occupant when a light-weighted child is seated or a child safety seat is placed on the rear seat.

In view of the above points, it is an object of the present disclosure to provide a vehicular air-conditioning device capable of realizing appropriate air conditioning in a rear seat area inside a vehicle compartment.

According to an aspect of the present disclosure, a vehicular air-conditioning device is capable of realizing air conditioning of a part of an area inside a vehicle compartment. The area includes multiple areas including at least a rear seat area, and the vehicular air-conditioning device includes an air volume regulator configured to regulate a volume of air-conditioning air blown to each of the areas, and an air-conditioning control unit configured to control an operation of the air volume regulator. The air-conditioning control unit is activated at least when opening and closing of a rear seat door used for getting in or out of the rear seat area are performed during a stoppage of a vehicle system. The air-conditioning control unit controls the operation of the air volume regulator to blow the air-conditioning air to the rear seat area when an activation switch of the vehicle system is turned on in a state where the air-conditioning control unit has been activated by the opening and closing of the rear seat door.

Accordingly, it is possible to detect whether the rear seat is occupied by an occupant by opening and closing of the rear seat door during a stoppage of the vehicle system. Thus, it is possible to detect whether the rear seat is occupied by an occupant without additionally providing an expensive seat sensor in the rear seat. Further, there is no erroneous detection that may occur in the configuration that detects the seating position of an occupant using a seat sensor. As a result, it is possible to realize appropriate air conditioning in the rear seat area.

Further, the air-conditioning control unit is activated when the rear seat door is opened and closed. Thus, it is possible to prevent the air-conditioning control unit from consuming power during a stoppage of the vehicle system. In addition, the air-conditioning control unit is already active when the activation switch of the vehicle system is turned on. Thus, it is possible to promptly start air conditioning in an area including the rear seat area after the activation of the vehicle system.

The "opening and closing of the rear seat door" in the present disclosure indicates that the rear seat door is opened and then closed. The "vehicle system" indicates the entire control target system mounted on a vehicle that includes not only the vehicular air-conditioning device, but also a driving device that outputs a driving force for vehicle traveling (that is, an engine and a traveling electric motor).

The "air-conditioning control unit" in the present disclosure is not limited to one that controls the operation of the air volume regulator to blow air-conditioning air to the rear seat area without exception when the activation switch of the vehicle system is turned on in a state where the air-conditioning control unit has been activated by the opening and closing of the rear seat door. That is, the air-conditioning control unit may control the operation of the air volume regulator to blow air-conditioning air to the rear seat area in an appropriate manner in accordance with another condition in a state where the air-conditioning control unit has been activated by the opening and closing of the rear seat door.

DESCRIPTION OF EMBODIMENTS

Figure 1:
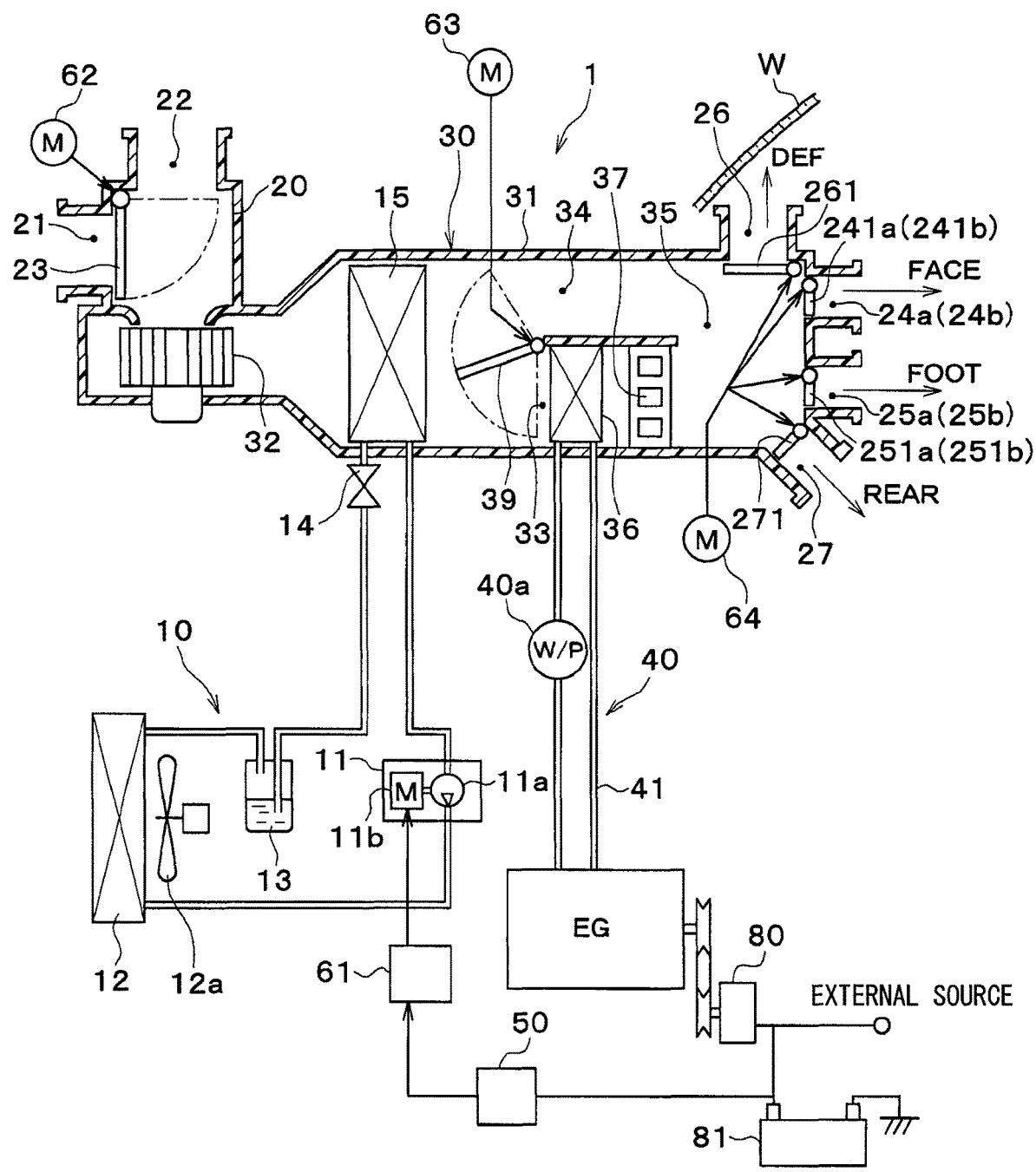
FIG. 1 is a schematic configuration diagram of a vehicular air-conditioning device of an embodiment of the present disclosure.

Hereinbelow, an embodiment of the present disclosure will be described with reference to FIGS. 1 to 11. A vehicular air-conditioning device 1 of the present embodiment is applied to a hybrid vehicle which obtains a driving force for vehicle traveling from both of an internal combustion engine (engine) EG and a traveling electric motor. Further, the hybrid vehicle of the present embodiment is configured as a plug-in hybrid vehicle which is capable of charging a battery 81 with power supplied from an external source (e.g., a commercial power source) during a stop of the vehicle.

In the plug-in hybrid vehicle, the battery 81 can be charged by the external source during a stop of the vehicle before the vehicle starts traveling. Thus, when a state of charge SOC of the battery 81 is equal to or higher than a predetermined traveling reference state of charge, such as when the vehicle starts traveling, the vehicle comes into an EV traveling mode in which the vehicle travels mainly by a driving force of the traveling electric motor. On the other hand, when the state of charge SOC of the battery 81 is lower than the traveling reference state of charge, such as after traveling by a certain distance, the vehicle comes into an HV traveling mode in which the vehicle travels mainly by a driving force of the engine EG.

In the plug-in hybrid vehicle, it is possible to reduce the amount of fuel consumption compared to that in a common vehicle, which obtains the driving force for vehicle traveling only from the engine EG, to improve fuel efficiency of the vehicle by switching between the EV traveling mode and the HV traveling mode in this manner. Further, the switching between the EV traveling mode and the HV traveling mode is controlled by a driving force controller 70 (described below).

The driving force output from the engine EG is used not only for vehicle traveling, but also for operating a generator 80. Power generated by the generator 80 and power supplied from the external source can be stored in the battery 81. The power stored in the battery 81 can be supplied not only to the traveling electric motor, but also to various onboard devices, such as an electric device, which constitute the vehicular air-conditioning device 1.

Next, a detailed configuration of the vehicular air-conditioning device 1 of the present embodiment will be described. The vehicular air-conditioning device 1 of the present embodiment is capable of realizing air conditioning in a partial area inside a vehicle compartment (so-called zone air conditioning).

More specifically, in the vehicular air-conditioning device 1 of the present embodiment, a vehicle-compartment interior space, which is an air-conditioning target space, is broadly divided into a plurality of areas including an area around a driver seat (hereinbelow, referred to as a driver seat area), an area around a front passenger seat (hereinbelow, referred to as a front passenger seat area), and an area around a rear seat (hereinbelow, referred to as a rear seat area).

The zone air conditioning is realized by blowing temperature-regulated air (that is, air-conditioning air) to at least some of these areas. The driver seat during traveling of the vehicle is occupied by the driver without exception. Thus, in the vehicular air-conditioning device 1 of the present embodiment, when the zone air conditioning is performed, the air conditioning is performed in an area including at least the driver seat area.

As illustrated in FIG. 1, the vehicular air-conditioning device 1 includes a refrigeration cycle device 10, an indoor air-conditioning unit 30, and an air-conditioning controller 50. Various constituent devices for blowing the air-conditioning air into the vehicle compartment are integrated (that is, unitized) to construct the indoor air-conditioning unit 30. The indoor air-conditioning unit 30 is disposed inside an instrument panel at the foremost part of the inside of the vehicle compartment.

The indoor air-conditioning unit 30 includes a casing 31 which forms an outer shell of the indoor air-conditioning unit 30 and forms an air passage through which air blown into the vehicle compartment flows inside thereof. The casing 31 is formed of a resin having a certain degree of elasticity and an excellent strength (e.g., polypropylene).

A blower 32, an evaporator 15, an air mix door 39, a heater core 36, and a PTC heater 37 are disposed in the air passage formed inside the casing 31. An inside and outside air switching device 20 is disposed on the most upstream side in the blown air flow of the casing 31. The inside and outside air switching device 20 adjusts an introduction ratio between inside air (that is, air inside the vehicle compartment) and outside air (that is, air outside the vehicle compartment).

An inside air introduction port 21 and an outside air introduction port 22 are formed on the inside and outside air switching device 20. The inside air introduction port 21 is an open hole for introducing the inside air into the casing 31. The outside air introduction port 22 is an open hole for introducing the outside air into the casing 31. Further, an inside and outside air switching door 23 is disposed inside the inside and outside air switching device 20.

The inside and outside air switching door 23 continuously changes the open area of the inside air introduction port 21 and the open area of the outside air introduction port 22 to switch a suction port mode. The suction port mode switched by the inside and outside air switching door 23 includes an all-inside air mode, an all-outside air mode, and an inside and outside air mixing mode.

In the all-inside air mode, the inside air introduction port 21 is fully open and the outside air introduction port 22 is fully closed to introduce the inside air to the air passage inside the casing 31. In the all-outside air mode, the inside air introduction port 21 is fully closed and the outside air introduction port 22 is fully open to introduce the outside air to the air passage inside the casing 31.

In the inside and outside air mixing mode, the open area of the inside air introduction port 21 and the open area of the outside air introduction port 22 are continuously adjusted to continuously change an air volume ratio between the volume of inside air and the volume of outside air, the inside air and the outside air being introduced to the air passage inside the casing 31. The inside and outside air switching door 23 is driven by an electric actuator 62 for the inside and outside air switching door. The operation of the electric actuator 62 is controlled by a control signal output from the air-conditioning controller 50 (described below).

The blower 32 is disposed on the downstream side in the air flow of the inside and outside air switching device 20 inside the casing 31. The blower 32 is a blowing device that blows air sucked through the inside and outside air switching device 20 toward the inside of the vehicle compartment. The blower 32 is an electric blower in which a centrifugal multi-blade fan is driven by an electric motor. A rotation speed (that is, a blowing capacity) of the blower 32 is controlled by a control voltage output from the air-conditioning controller 50.

The evaporator 15 is disposed on the downstream side in the air flow of the blower 32. The evaporator 15 constitutes the refrigeration cycle device 10. The evaporator 15 is a cooling heat exchanger that performs heat exchange between a low-pressure refrigerant and air blown from the blower 32 to evaporate the low-pressure refrigerant so that the refrigerant exhibits a heat absorbing action to cool the blown air in the refrigeration cycle device 10.

The refrigeration cycle device 10 will be described. As illustrated in FIG. 1, the refrigeration cycle device 10 includes a compressor 11, a condenser 12, a receiver 13, an expansion valve 14, and the evaporator 15 which are annularly connected through a refrigerant pipe.

The compressor 11 sucks a refrigerant in the refrigeration cycle device 10, and compresses and discharges the refrigerant. The compressor 11 is disposed inside an engine room. The compressor 11 is an electric compressor in which a fixed capacity type compression mechanism 11a whose discharge capacity is fixed is driven by an electric motor 11b. The electric motor 11b is an alternating-current motor whose rotation speed is controlled by an alternating-current voltage output from an inverter 61.

The inverter 61 outputs an alternating-current voltage having a frequency corresponding to a control signal output from the air-conditioning controller 50. Accordingly, the rotation speed of the electric motor 11b is controlled, so that a refrigerant discharge capacity of the compressor 11 is adjusted.

A refrigerant inlet side of the condenser 12 is connected to a discharge port of the compressor 11. The condenser 12 is disposed on the vehicle front side inside the engine room. The condenser 12 is a radiation heat exchanger that performs heat exchange between a high-pressure refrigerant and outside air blown from a blowing fan 12a to condense the high-pressure refrigerant by heat radiation. The blowing fan 12a is an electric blower whose rotation speed (that is, a blowing capacity) is controlled by a control voltage output from the air-conditioning controller 50.

An inlet side of the receiver 13 is connected to a refrigerant outlet of the condenser 12. The receiver 13 is a gas-liquid separator that separates gas and liquid of the refrigerant condensed by the condenser 12 to store a surplus refrigerant of the cycle and feeds the separated liquid-phase refrigerant to the downstream side.

An inlet side of the expansion valve 14 is connected to a liquid-phase refrigerant outlet of the receiver 13. The expansion valve 14 is disposed inside the engine room. The expansion valve 14 is a pressure reducing device that pressure-reduces and expands the liquid-phase refrigerant flowing out of the receiver 13. In the present embodiment, a temperature expansion valve that adjusts a refrigerant flow rate so that the degree of superheat in the refrigerant on the outlet side of the evaporator 15 approaches a predetermined reference superheat degree is employed as the expansion valve 14.

A refrigerant inlet side of the evaporator 15 is connected to an outlet port of the expansion valve 14. A refrigerant suction port side of the compressor 11 is connected to a refrigerant outlet of the evaporator 15. This constructs a vapor compression refrigeration cycle in which the refrigerant circulates through the discharge port of the compressor 11, the condenser 12, the receiver 13, the expansion valve 14, the evaporator 15, and the suction port of the compressor 11 in this order.

A cool air heating passage 33 and a cool air bypass passage 34 are formed on the downstream side in the air flow of the evaporator 15 in the casing 31. The cool air heating passage 33 and the cool air bypass passage 34 are formed in parallel to each other with respect to the blown air flow. Further, a mixing space 35 is formed on the downstream side in the air flow of the cool air heating passage 33 and the cool air bypass passage 34. In the mixing space 35, blown air flowing out of the cool air heating passage 33 and blown air flowing out of the cool air bypass passage 34 are mixed.

In the cool air heating passage 33, the heater core 36 and the PTC heater 37 for heating air that has passed through the evaporator 15 are disposed in this order in the flow direction of blown air. The heater core 36 is a heating heat exchanger that performs heat exchange between an engine coolant (hereinbelow, merely referred to as the coolant) that cools the engine EG and blown air flowing into the cool air heating passage 33 to heat the blown air.

The heater core 36 and the engine EG are connected through a coolant pipe 41. Thus, a coolant circuit 40 for circulating the coolant is formed between the heater core 36 and the engine EG. Further, a coolant pump 40a for circulating the coolant is disposed in the coolant circuit 40. The coolant pump 40a is an electric water pump whose rotation speed (that is, a water pressure-feeding capacity) is controlled by a control voltage output from the air-conditioning controller 50.

The PTC heater 37 is an electric heater that includes a PTC element (that is, a positive temperature coefficient thermistor). The PTC heater 37 is an auxiliary heating device that generates heat by the supply of power to the PTC element from the air-conditioning controller 50 to heat air that has passed through the heater core 36. The PTC heater 37 includes a plurality of PTC elements (three PTC elements in the present embodiment). Thus, the heating capacity of the entire PTC heater 37 can be changed by changing the number of PTC elements to which power is supplied by the air-conditioning controller 50.

The cool air bypass passage 34 is an air passage for guiding air that has passed through the evaporator 15 to the mixing space 35 without allowing the air to pass through the heater core 36 and the PTC heater 37. Thus, the temperature of blown air mixed in the mixing space 35 can be changed by changing an air volume ratio between the volume of blown air flowing through the cool air heating passage 33 and the volume of blown air flowing through the cool air bypass passage 34.

Thus, in the present embodiment, the air mix door 39 is disposed inside the air passage as a blown air temperature regulation unit that changes the air volume ratio to regulate the temperature of the blown air mixed in the mixing space 35.

The air mix door 39 is disposed on the downstream side in the air flow of the evaporator 15 and on the inlet side of the cool air heating passage 33 and the cool air bypass passage 34. The air mix door 39 continuously changes the open area of an inlet port of the cool air heating passage 33 and the open area of an inlet port of the cool air bypass passage 34.

Thus, the temperature of the blown air mixed in the mixing space 35 can be regulated by changing the degree of opening of the air mix door 39. The air mix door 39 is driven by an electric actuator 63 for the air mix door. The operation of the electric actuator 63 is controlled by a control signal output from the air-conditioning controller 50.

A plurality of open holes are formed on the most downstream part in the blown air flow of the casing 31. The open holes are holes for allowing the temperature-regulated blown air to flow out of the mixing space 35 into the inside of the vehicle compartment. In the present embodiment, the open holes include a defroster open hole 26, face open holes 24a, 24b, foot open holes 25a, 25b, and a rear open hole 27.

More specifically, the driver seat side face open hole 24a and the front passenger seat side face open hole 24b are formed as the face open holes. Further, the driver seat side foot open hole 25a and the front passenger seat side foot open hole 25b are formed as the foot open holes.

The driver seat side face open hole 24a is an open hole for blowing air-conditioning air toward the upper body of an occupant seated on the driver seat. Thus, the driver seat side face open hole 24a is an open hole for blowing air-conditioning air to the driver seat area. The front passenger seat side face open hole 24b is an open hole for blowing air-conditioning air toward the upper body of an occupant seated on the front passenger seat. Thus, the front passenger seat side face open hole 24b is an open hole for blowing air-conditioning air to the front passenger seat area.

The driver seat side foot open hole 25a is an open hole for blowing air-conditioning air toward the feet of an occupant seated on the driver seat. Thus, the driver seat side foot open hole 25a is an open hole for blowing air-conditioning air to the driver seat area. The front passenger seat side foot open hole 25b is an open hole for blowing air-conditioning air toward the upper body of an occupant seated on the front passenger seat. Thus, the front passenger seat side foot open hole 25b is an open hole for blowing air-conditioning air to the front passenger seat area.

The defroster open hole 26 is an open hole for blowing air-conditioning air toward the inner side face of a vehicle front window glass W. The rear open hole 27 is an open hole for blowing air-conditioning air to the rear seat side. Thus, the rear open hole 27 is an open hole for blowing air-conditioning air to the rear seat area. The open holes 24a to 27 are connected to dedicated blowing ports (not illustrated) disposed inside the vehicle compartment through ducts each of which forms an air passage.

Blowing port mode doors 241a to 271 are disposed on the upstream side in the air flow of the driver seat side face open hole 24a, the front passenger seat side face open hole 24b, the driver seat side foot open hole 25a, the front passenger seat side foot open hole 25b, the defroster open hole 26, and the rear open hole 27, respectively. The blowing port mode doors 241a to 271 adjust the open areas of the respective open holes. The blowing port mode doors 241a to 271 adjust the open areas of the respective open holes to switch a blowing port mode.

More specifically, the driver seat side face door 241a adjusts the open area of the driver seat side face open hole 24a. The front passenger seat side face door 241b adjusts the open area of the front passenger seat side face open hole 24b. The driver seat side foot door 251a adjusts the open area of the driver seat side foot open hole 25a. The front passenger seat side foot door 251b adjusts the open area of the front passenger seat side foot open hole 25b. The defroster door 261 adjusts the open area of the defroster open hole 26. The rear door 271 adjusts the open area of the rear open hole 27.

In FIG. 1, for clear illustration, the driver seat side face open hole 24a and the driver seat side foot open hole 25a are illustrated, and the front passenger seat side face open hole 24b and the front passenger seat side foot open hole 25b are not illustrated. The reference sign of the front passenger seat side open hole is indicated inside the parentheses next to the reference sign of the corresponding driver seat side open hole. The same applies to the front passenger seat side face door 241b and the front passenger seat side foot door 251b.

The blowing port mode doors 241a to 271 are coupled to a link mechanism (not illustrated) and driven in a ganged manner by an electric actuator 64 for the blowing port mode doors. The operation of the electric actuator 64 is controlled by a control signal output from the air-conditioning controller 50. Of course, each of the doors 241a to 271 may be driven by a dedicated electric actuator.

The blowing port mode switched by the blowing port mode doors 241a to 271 includes a face mode, a bi-level mode, a foot mode, a foot defroster mode, and a defroster mode.

In the face mode, the face open hole 24a (24b) is fully open so that air-conditioning air is blown toward the upper body of an occupant through the face open hole 24a (24b). In the bi-level mode, both of the face open hole 24a (24b) and the foot open hole 25a (25b) are open so that air-conditioning air is blown toward both of the upper body and the feet of an occupant.

In the foot mode, the foot open hole 25a (25b) is fully open and the defroster open hole 26 is open by a small opening degree so that air-conditioning air is blown mainly through the foot open hole 25a (25b). In the foot defroster mode, the foot open hole 25a (25b) and the defroster open hole 26 are open by the same degree so that air-conditioning air is blown through both of the foot open hole 25a (25b) and the defroster open hole 26.

In the defroster mode, the defroster open hole 26 is fully open so that air is blown toward the inner face of the vehicle front window glass W through the defroster open hole 26. An occupant can operate a blowing port mode selector switch on an operation panel 60 (described below) to switch the blowing port mode to the defroster mode in order to preferentially perform defogging of the vehicle front window glass W.

In the vehicular air-conditioning device 1 of the present embodiment, the zone air conditioning described above is realized by opening and closing operations of the blowing port mode doors 241a to 271. For example, the zone air conditioning only in the driver seat area can be performed by closing the front passenger seat side face open hole 24b with the front passenger seat side face door 241*b*, closing the front passenger seat side foot open hole 25*b* with the front passenger seat side foot door 251*b*, and closing the rear open hole 27*a* with the rear door 271.

That is, the blowing port mode doors 241*a* to 271 of the present embodiment function as an air volume regulator that regulates the volume of air-conditioning air blown to the driver seat area, the front passenger seat area, and the rear seat area. In the blowing port mode doors 241*a* to 271 of the present embodiment, the blowing port mode can be switched for each area where air conditioning is performed among the driver seat area and the front passenger seat area even during the execution of the zone air conditioning.

Figure 2:
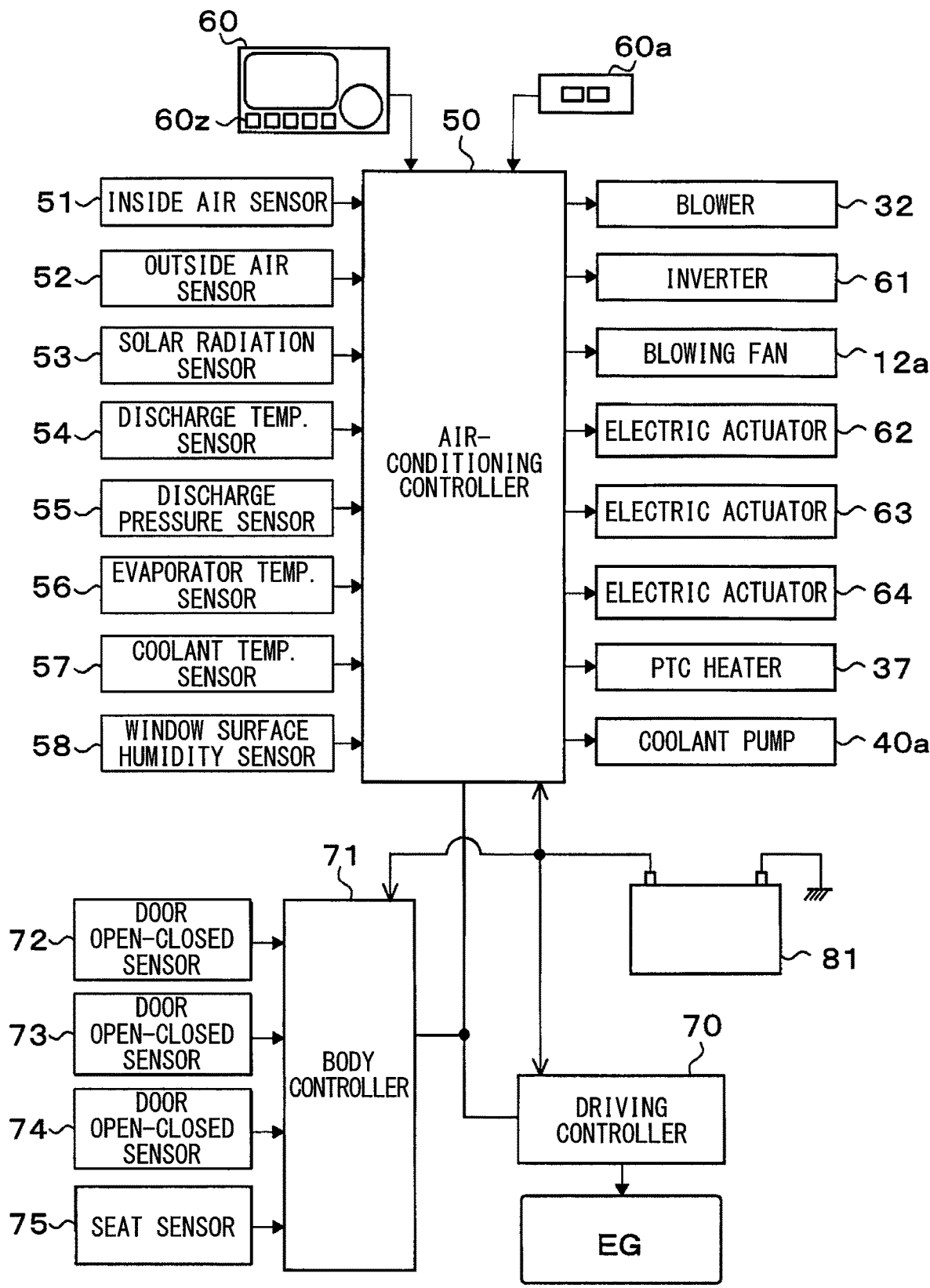
FIG. 2 is a block diagram illustrating an electric control unit of the vehicular air-conditioning device of the embodiment.

Next, an outline of an electric control unit of the present embodiment will be described with reference to FIG. 2. A plurality of controllers (control units) including the air-conditioning controller 50, the driving force controller 70, and a body controller 71 are mounted on the vehicle of the present embodiment. Each of the controllers 50, 70, 71 includes a known microcomputer which includes a CPU, a ROM, and a RAM and a peripheral circuit thereof, and performs various calculations and processes in accordance with control programs stored in the ROM to control the operations of various devices connected to the output side.

The driving force controller 70 is a driving force control unit that controls the operations of various engine control devices which constitute the engine EG and a traveling inverter which supplies an alternating current to the traveling electric motor. The driving force controller 70 is activated by power supplied from the battery 81 when an occupant turns on an activation switch (hereinbelow, referred to as the IG switch) of the vehicle system. Then, the driving force controller 70 controls the operations of the various engine control devices and the traveling inverter in accordance with detection signals of a sensor group for driving force control which is connected to the input side.

The vehicle system of the present embodiment is not limited to the engine EG, the traveling electric motor, and the driving force controller 70 which relate to the driving force for traveling, but refers to the entire control target system mounted on the vehicle including the vehicular air-conditioning device 1.

The body controller 71 is a body control unit that controls the operation of an antitheft device. The body controller 71 is in operation by power supplied from the battery 81 even during a stop of the vehicle system. A driver seat door open-closed sensor 72, a front passenger seat door open-closed sensor 73, a rear seat door open-closed sensor 74, and a front passenger seat side seat sensor 75 are connected to the input side of the body controller 71.

The driver seat door open-closed sensor 72 is a driver seat door open-closed detection unit that detects opening and closing of a driver seat side door. The front passenger seat door open-closed sensor 73 is a front passenger seat door open-closed detection unit that detects opening and closing of a front passenger seat side door. The rear seat door open-closed sensor 74 is a rear seat door open-closed detection unit that detects opening and closing of a rear seat door.

A detection signal output from each of the door open-closed sensors 72 to 74 is input to the body controller 71. In addition, the body controller 71 is capable of not only detecting opening and closing of each of the doors on the basis of the detection signal, but also detecting and storing an elapsed time from the opening to the closing of the door.

The front passenger seat side seat sensor 75 is a front passenger seat side seat detection unit that detects seating of an occupant on the front passenger seat. The front passenger seat side seat sensor 75 includes a pressure sensor that is disposed on a seat part of the front passenger seat. When the front passenger seat side seat sensor 75 determines that an occupant is seated on the front passenger seat and a seat belt of the front passenger seat is unworn during operation of the vehicle system, the body controller 71 of the present embodiment turns on a warning lamp that urges the occupant on the front passenger seat to wear the seat belt.

The air-conditioning controller 50 is an air-conditioning control unit that controls the operations of various air-conditioning control devices that constitute the vehicular air-conditioning device 1. The air-conditioning controller 50 is activated by power supplied from the battery 81 when an occupant turns on the IG switch or when the body controller 71 outputs an activation signal.

The blower 32, the inverter 61 for the electric motor 11*b* of the compressor 11, the blowing fan 12*a*, the various electric actuators 62, 63, 64, the PTC heater 37, and the coolant pump 40*a* are connected to the output side of the air-conditioning controller 50.

A sensor group of various sensors for air-conditioning control including an inside air sensor 51, an outside air sensor 52, a solar radiation sensor 53, a discharge temperature sensor 54, a discharge pressure sensor 55, an evaporator temperature sensor 56, a coolant temperature sensor 57, and a window surface humidity sensor 58 is connected to the input side of the air-conditioning controller 50.

The inside air sensor 51 is an inside air temperature detection unit that detects a vehicle-compartment interior temperature (that is, an inside air temperature) Tr. The outside air sensor 52 is an outside air temperature detection unit that detects an outside air temperature Tam. The solar radiation sensor 53 is a solar radiation amount detection unit that detects a solar radiation amount Ts inside the vehicle compartment. The discharge temperature sensor 54 is a discharge temperature detection unit that detects a temperature Td of a refrigerant discharged from the compressor 11. The discharge pressure sensor 55 is a discharge pressure detection unit that detects a pressure Pd of a refrigerant discharged from the compressor 11. The evaporator temperature sensor 56 is an evaporator temperature detection unit that detects a blown air temperature TE of air blown from the evaporator 15 (substantially, the evaporator temperature). The coolant temperature sensor 57 is a coolant temperature detection unit that detects a coolant temperature TW of a coolant flowing out of the engine EG. The window surface humidity sensor 58 is a humidity detection unit that detects a near-window humidity RH which is the humidity of air inside the vehicle compartment near the window glass.

Specifically, the evaporator temperature sensor 56 of the present embodiment detects the temperature of a heat exchange fin of the evaporator 15. Of course, a temperature detection unit that detects the temperature of another part of the evaporator 15 or a temperature detection unit that detects the temperature of a refrigerant itself flowing through the evaporator 15 may be employed as the evaporator temperature sensor 56.

The operation panel 60 for front seats which is disposed near the instrument panel at the front part of the inside of the vehicle compartment and a rear seat side operation panel 60*a* which is disposed on an armrest of the rear seat are connected to the input side of the air-conditioning controller 50. Operation signals of various switches which are disposed on the operation panel 60 and the rear seat side operation panel 60*a* are input to the air-conditioning controller 50.

Specifically, the operation switches disposed on the operation panel 60 include an air-conditioning switch, an automation switch, a suction port mode selector switch, the blowing port mode selector switch, an air volume setting switch, a temperature setting switch, and a zone air-conditioning setting switch 60z.

The air-conditioning switch is a compressor operation setting unit that performs switching between operation and stop of the compressor 11 by an operation of an occupant. The automation switch is an automatic control setting unit that sets or cancels automatic control of the vehicular air-conditioning device 1 by an operation of an occupant. The suction port mode selector switch is a suction port mode setting unit that switches the suction port mode by an operation of an occupant. The blowing port mode selector switch is a blowing port mode setting unit that switches the blowing port mode by an operation of an occupant. The air volume setting switch is an air volume setting unit for manually setting a blowing volume of the blower 32. The temperature setting switch is a target temperature setting unit that sets a vehicle-compartment interior target temperature Tset by an operation of an occupant. The zone air-conditioning setting switch 60z is a zone air-conditioning setting unit that sets a zone air-conditioning mode that performs the zone air conditioning and an all-seat air-conditioning mode that performs air conditioning in all areas inside the vehicle compartment without performing the zone air conditioning in a switching manner by an operation of an occupant.

In the vehicular air-conditioning device 1 of the present embodiment, when the IG switch is turned on, the air-conditioning mode is set to the zone air-conditioning mode. That is, even when the vehicle system is stopped with the air-conditioning mode switched to the all-seat air-conditioning mode through the zone air-conditioning setting switch 60z in the previous traveling, the air-conditioning mode is changed to the zone air-conditioning mode without exception by turning on the IG switch.

Specifically, a rear seat operation switch disposed on the rear seat side operation panel 60a includes a rear seat side air distribution switch. The rear seat side air distribution switch is a rear seat side air distribution setting unit that requests or prohibits blowing of air-conditioning air to the rear seat side.

The operation panel 60 is further provided with a display unit that displays a current operation state of the vehicular air-conditioning device 1. The display unit is capable of displaying information indicating that the zone air conditioning is being executed and information relating to an area where the zone air conditioning is being executed.

The air-conditioning controller 50, the driving force controller 70, and the body controller 71 are electrically communicably connected to each other. More specifically, the air-conditioning controller 50, the driving force controller 70, and the body controller 71 of the present embodiment are communicably connected by a multiplex communication system (so-called CAN (registered trademark)).

Accordingly, it is possible to control the operation of another controller and control the operations of various devices connected to the output side of another controller in accordance with a detection signal or an operation signal input to any one of the controllers.

For example, the body controller 71 is capable of outputting an activation signal to the air-conditioning controller 50. Even when the IG switch is not on, it is possible to supply power to the air-conditioning controller 50 from the battery 81 by operating a relay circuit inside the air-conditioning controller 50 by the activation signal. That is, even when the IG switch is not on, the air-conditioning controller 50 can be activated.

Each of the air-conditioning controller 50, the driving force controller 70, and the body controller 71 can be described as an integrated controller in which control units that control various control target devices connected to the output side thereof are integrated. That is, in each of the controllers 50, 70, 71, hardware and software that control the operation of each of the control target devices constitute a control unit that controls the operation of each of the control target devices.

For example, the air-conditioning controller 50 which is integrated as the air-conditioning control unit can be described as an integrated controller in which a discharge capacity control unit that controls the operation of the compressor 11 and an air volume control unit that controls the operation of the electric actuator 64 for the blowing port mode doors which drives the blowing port mode doors 241a to 271 are integrated.

Next, the operation of the vehicular air-conditioning device 1 of the present embodiment in the above configuration will be described with reference to FIGS. 3 to 11. Control steps illustrated in flowcharts of FIGS. 3 to 11 constitute various function implementation sections included in the controllers.

First, door open-closed monitoring control executed by the body controller 71 will be described with reference to FIG. 3. A control process illustrated in the flowchart of FIG. 3 is executed every predetermined period as a subroutine of a control process of a main routine executed by the body controller 71 during a stop of the vehicle system.

Figure 3:
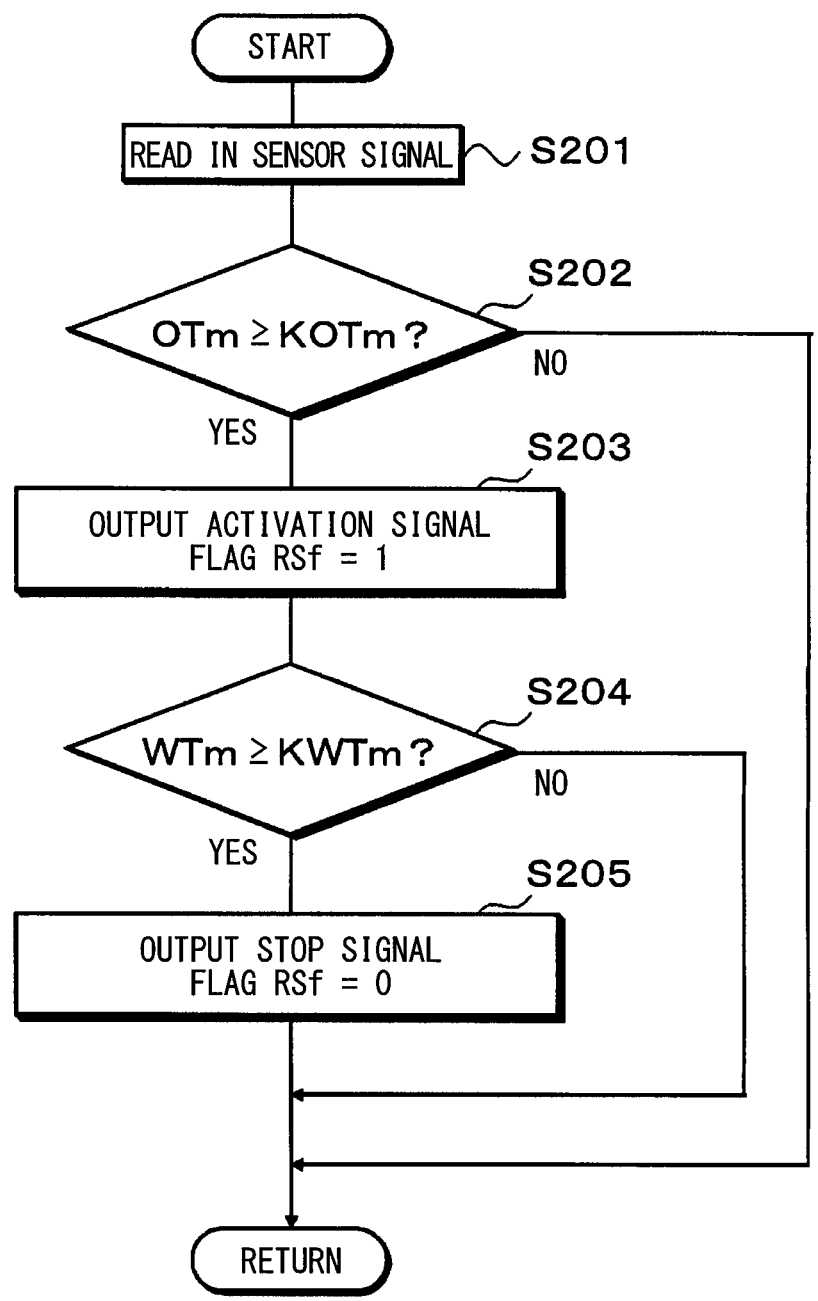
FIG. 3 is a flowchart illustrating a part of a control process of a body controller mounted on a vehicle of the embodiment.

As illustrated in FIG. 3, in step S201, a detection signal of each of the door open-closed sensors 72 to 74 connected to the body controller 71 is read in. In the following step S202, it is determined whether an opening time OTm from opening to closing of the rear seat door is equal to or longer than a predetermined reference opening time KOTm (two seconds in the present embodiment) on the basis of a detection signal of the rear seat door open-closed sensor 74.

When the opening time OTm is relatively long, there is a high possibility that the rear seat is occupied by an occupant. On the other hand, when the opening time OTm is relatively short, there is a high possibility that the rear seat door is opened and closed for carrying baggage into the rear seat or carrying baggage out of the rear seat.

Thus, in the present embodiment, when it is determined that the opening time OTm is equal to or longer than the reference opening time KOTm in step S202, it is determined that the rear seat is occupied by an occupant, and the process proceeds to step S203. On the other hand, when it is determined that the opening time OTm is less than the reference opening time KOTm in step S202, it is determined that the rear seat is unoccupied by an occupant, and the process returns to the main routine.

In step S203, an activation signal is output to the air-conditioning controller 50. In other words, the air-conditioning controller 50 of the present embodiment is activated by the activation signal output from the body controller 71 at least when the rear seat door is opened and closed during a stop of the vehicle system and the opening time OTm of the rear seat door is equal to or longer than the reference opening time KOTm.

Further, in step S203, the body controller 71 sets a rear seat storage flag RSf of the air-conditioning controller 50 to 1. The rear seat storage flag indicates that the rear seat is occupied by an occupant.

Next, in step S204, it is determined whether a standby time WTm which is an elapsed time from the opening of the rear seat door is equal to or longer than a predetermined reference standby time KWTm (60 minutes in the present embodiment) on the basis of a detection signal of the rear seat door open-closed sensor 74.

When the standby time WTm is a long time of an extent exceeding one hour, there is a high possibility that the rear seat door is opened and closed for carrying baggage into the rear seat or carrying baggage out of the rear seat.

Thus, in the present embodiment, when it is determined that the standby time WTm is equal to or longer than the reference standby time KWTm in step S204, it is determined that the rear seat is unoccupied by an occupant, and the process proceeds to step S205. On the other hand, when it is determined that the standby time WTm is less than the reference standby time KWTm in step S204, the process returns to the main routine.

In step S205, a stop signal is output to the air-conditioning controller 50. In other words, the air-conditioning controller 50 of the present embodiment is stopped by the stop signal output from the body controller 71 when the air-conditioning controller 50 is in an activated state by opening and closing of the rear seat door and the standby time WTm becomes equal to or longer than the reference standby time KWTm before the IG switch is turned on.

In step S205, the body controller 71 changes the rear seat storage flag RSf of the air-conditioning controller 50 to 0, and the process returns to the main routine.

Figure 4:
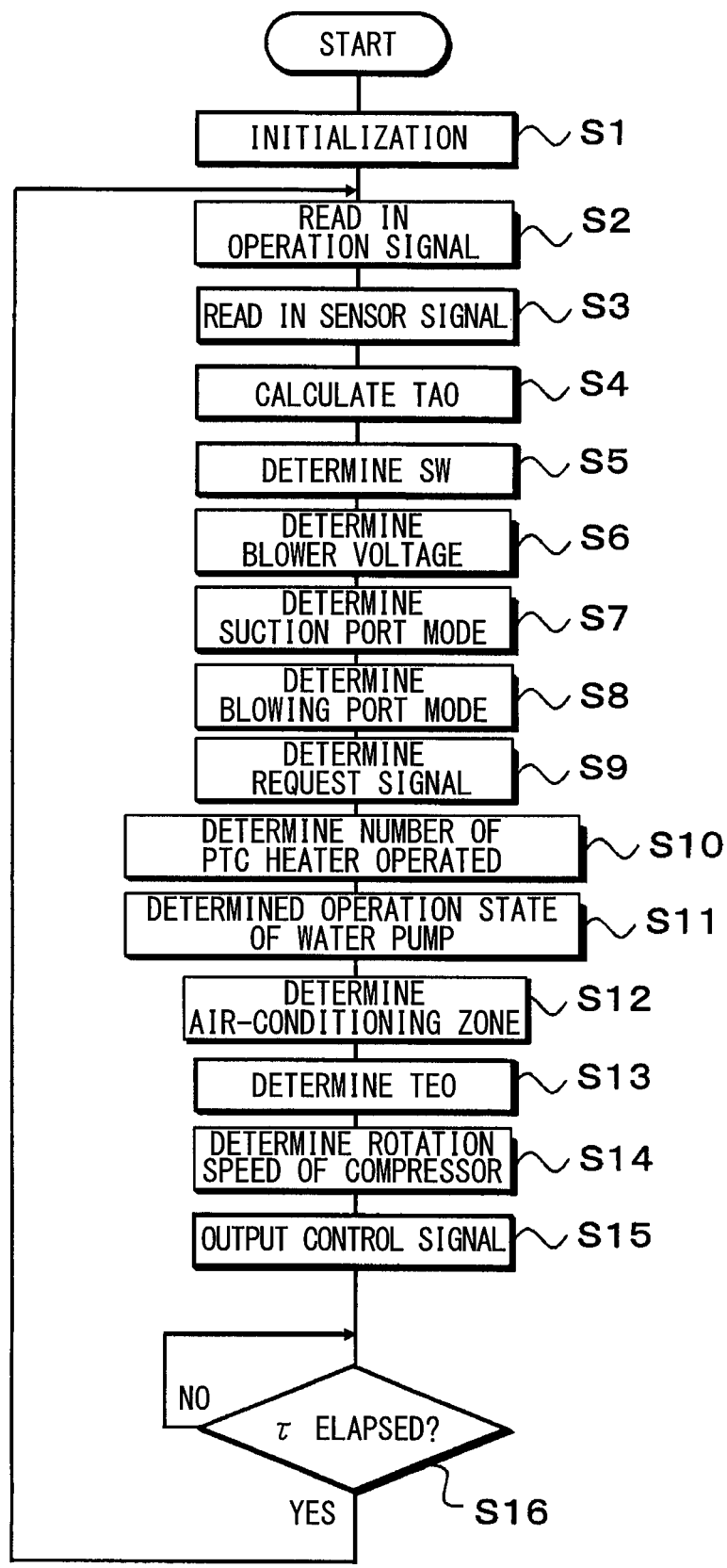
FIG. 4 is a flowchart illustrating a control process of an air-conditioning controller of the vehicular air-conditioning device of the embodiment.

Next, air-conditioning control executed by the air-conditioning controller 50 will be described with reference to FIGS. 4 to 11. A control process illustrated in the flowchart of FIG. 4 is executed as a main routine of the air-conditioning control. The control process is executed when the automation switch of the operation panel 60 is turned on after activation of the vehicle system (that is, after the IG switch is turned on).

First, in step S1, initialization of a flag and a timer and initialization such as initial alignment of a stepping motor which constitutes the above electric actuator are performed. In step S1, not all flags and calculation values are initialized. For example, values stored at the previous operation end of the vehicular air-conditioning device 1 are maintained for some flags and calculation values. The rear seat storage flag RSf described above is initialized to 0 when the IG switch is turned OFF.

Next, in step S2, an operation signal of the operation panel 60 is read in. Then, the process proceeds to step S3. In step S3, signals of a vehicle environment state used in the air-conditioning control, that is, detection signals of the sensor group of the sensors 51 to 58 described above are read in. Then, the process proceeds to step S4. Further, in step S3, control signals output from the driving force controller 70 and the body controller 71 are read in.

In step S4, a target blowing temperature TAO of air blown into the vehicle compartment at the front seat side is calculated. The target blowing temperature TAO is calculated by the following formula F1.

$$TAO = Kset \times Tset - Kr \times Tr - Kam \times Tam - Ks \times Ts + C \quad (F1)$$

Tset is a vehicle-compartment interior set temperature set by the temperature setting switch. Tr is an inside air temperature detected by the inside air sensor 51. Tam is an outside air temperature detected by the outside air sensor 52. Ts is a solar radiation amount detected by the solar radiation sensor 53. Kset, Kr, Kam, and Ks are control gains, and C is a constant for correction.

The target blowing temperature TAO is a value correlated to the amount of heat that needs to be generated by the vehicular air-conditioning device 1 for maintaining the inside of the vehicle compartment at a desired temperature. Thus, the target blowing temperature TAO can be used as an index that indicates an air-conditioning load (in other words, an air-conditioning heat load) required of the vehicular air-conditioning device 1.

In the following steps S5 to S14, a control state of each of the various devices connected to the air-conditioning controller 50 is determined.

First, in step S5, a target opening degree SW of the air mix door 39 is determined. Specifically, in step S5, a provisional air mix opening degree SWdd is calculated by the following formula F2.

$$SWdd = \{TAO - (TE+2)\}/\{MAX(10, TW-(TE+2))\} \times 100 \, (\%) \quad (F2)$$

TE is a blown air temperature detected by the evaporator temperature sensor 56. TW is a coolant temperature detected by the coolant temperature sensor 57. In formula F2, {MAX (10, TW−(TE+2))} represents a value of the larger one of 10 and TW−(TE+2).

Then, the air mix opening degree SW is determined on the basis of the provisional air mix opening degree SWdd calculated by formula F2 with reference to a control map which is previously stored in the air-conditioning controller 50. In the control map, the air mix opening degree SW corresponding to the provisional air mix opening degree SWdd is nonlinearly determined.

This is because of the following reason. In the present embodiment, a cantilever door is employed as the air mix door 39. Thus, the open area of the inlet port of the cool air heating passage 33 and the open area of the inlet port of the cool air bypass passage 34 nonlinearly change in response to changes in the air mix opening degree SW.

When SW=0%, the air mix door 39 is displaced to a maximum cooling position. That is, the air mix door 39 is displaced to a position where the cool air bypass passage 34 is fully open and the cool air heating passage 33 is fully closed. When SW=100%, the air mix door 39 is displaced to a maximum heating position. That is, the air mix door 39 is displaced to a position where the cool air bypass passage 34 is fully closed and the cool air heating passage 33 is fully open.

Next, in step S6, a blowing capacity of the blower 32 is determined. More specifically, in step S6, a blower voltage applied to the electric motor of the blower 32 is determined. The details of step S6 will be described with reference to the flowchart of FIG. 5.

First, in step S61, it is determined whether the automation switch of the operation panel 60 is on. When it is determined that the automation switch is not on in step S61, the process proceeds to step S62. In step S62, a blower voltage that achieves an air volume desired by an occupant, the air volume being set by a manual operation using the air volume setting switch of the operation panel 60, is determined. Then, the process proceeds to step S7.

Specifically, the air volume setting switch of the present embodiment is capable of setting the air volume on five scales of Lo, M1, M2, M3, and Hi in the ascending order. The blower voltage is determined to be higher in the order of 4 V, 6 V, 8 V, 10 V, and 12 V.

On the other hand, when it is determined that the automation switch is on in step S61, the process proceeds to step S63. In step S63, a provisional blower voltage is determined. Then, the process proceeds to step S64. A value of the smaller one of a first blower level f (TAO) and a second blower level f (TW) is determined as the provisional blower voltage.

The first blower level f (TAO) is determined on the basis of the target blowing temperature TAO with reference to a control map which is previously stored in the air-conditioning controller 50.

Figure 5:
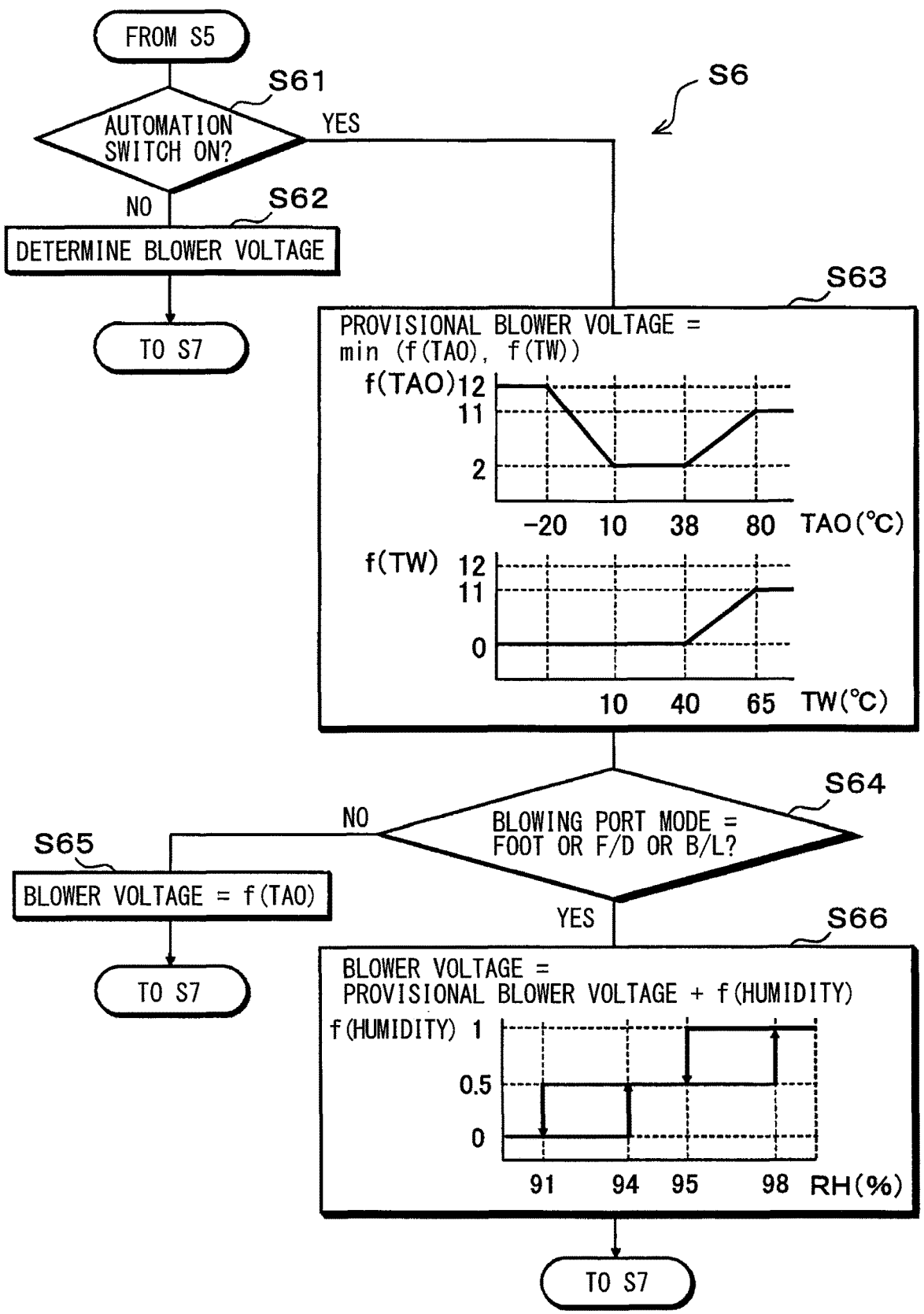
FIG. 5 is a flowchart illustrating a control process for determining a blower voltage in the control process of the air-conditioning controller of the embodiment.

In the control map, as shown in a control characteristic diagram described in step S63 of FIG. 5, the first blower level f (TAO) is raised in an extremely low temperature range (maximum cooling range) and an extremely high temperature range (maximum heating range) of the TAO to increase the air volume of the blower 32. When the TAO falls into an intermediate temperature range, the first blower level f (TAO) is lowered to reduce the air volume of the blower 32.

That is, the first blower level f (TAO) determines the blower voltage so as to increase the blowing capacity of the blower 32 when a high cooling capacity or a high heating capacity is required of the vehicular air-conditioning device 1.

The second blower level f (TW) is determined on the basis of the coolant temperature TW with reference to a control map which is previously stored in the air-conditioning controller 50.

In the control map, as shown in a control characteristic diagram described in step S63 of FIG. 5, when the coolant temperature TW is equal to or lower than a relatively low first reference coolant temperature (40° C. in the present embodiment), the second blower level f (TW) is set to 0. Further, the second blower level f (TW) is raised with a rise in the coolant temperature TW from the first reference coolant temperature to a second reference coolant temperature (65° C. in the present embodiment).

That is, the second blower level f (TW) determines the blower voltage so as to reduce the air volume of the blower 32 during warming up of the engine EG (that is, when the coolant temperature TW is low).

In step S64, it is determined whether a blowing port mode determined in step S8 (described below) is any of the foot mode (described as FOOT in FIG. 5), the foot defroster mode (described as F/D in FIG. 5), and the bi-level mode (described as B/L in FIG. 5).

When it is determined that the blowing port mode is none of the foot mode, the foot defroster mode, and the bi-level mode in step S64 (that is, when the blowing port mode is either the face mode or the defroster mode), the process proceeds to step S65. In step S65, the blower voltage is determined to the first blower level f (TAO). Then, the process proceeds to step S7.

On the other hand, when it is determined that the blowing port mode is any of the foot mode, the foot defroster mode, and the bi-level mode in step S64, the process proceeds to step S66. In step S66, the blower voltage is determined to a value obtained by adding a humidity correction factor f (humidity) to the provisional blower voltage determined in step S63. Then, the process proceeds to step S7.

More specifically, the humidity correction factor f (humidity) is determined on the basis of the near-window humidity RH detected by the window surface humidity sensor 58 with reference to a control map which is previously stored in the air-conditioning controller 50.

In the control map, as shown in a control characteristic diagram described in step S66 of FIG. 5, the humidity correction factor f (humidity) is increased with a rise in the near-window humidity RH. Accordingly, as the near-window humidity RH increases, the air volume of the blower 32 is increased to prevent window fogging. In the control characteristic diagram illustrated in step S66, a hysteresis width for preventing control hunting is set.

Next, in step S7, the suction port mode is determined. More specifically, a control signal output to the electric actuator 62 for the inside and outside air switching door is determined. The details of step S7 will be described with reference to the flowchart of FIG. 6.

First, in step S71, it is determined whether the automation switch of the operation panel 60 is on. When it is determined that the automation switch of the operation panel 60 is not on in step S71, the process proceeds to step S72. In step S72, it is determined whether outside air introduction (described as FRS in FIG. 6) is set by the suction port mode selector switch of the operation panel 60.

When it is determined that the outside air introduction is set in step S72, the process proceeds to step S73. In step S73, an outside air rate is set to 100% (that is, the all-outside air mode), and the process proceeds to step S8. When it is determined that the outside air introduction is not set in step S72, the process proceeds to step S74. In step S74, the outside air rate is set to 0% (that is, the all-inside air mode), and the process proceeds to step S8.

The outside air rate is the proportion of outside air in blown air introduced into the inside and outside air switching device 20. Thus, the outside air rate can also be referred to as an outside air introduction rate.

On the other hand, when it is determined that the automation switch of the operation panel 60 is on in step S71, the process proceeds to step S75. In step S75, it is determined which operation, a cooling operation or a heating operation, is being performed on the basis of the target blowing temperature TAO.

Specifically, in the present embodiment, when the target blowing temperature TAO is higher than 25° C., it is determined that the heating operation is being performed, and the process proceeds to step S76. In step S76, the outside air rate is determined on the basis of the near-window humidity RH with reference to a control map which is previously stored in the air-conditioning controller 50. Then, the process proceeds to step S8.

Figure 6:
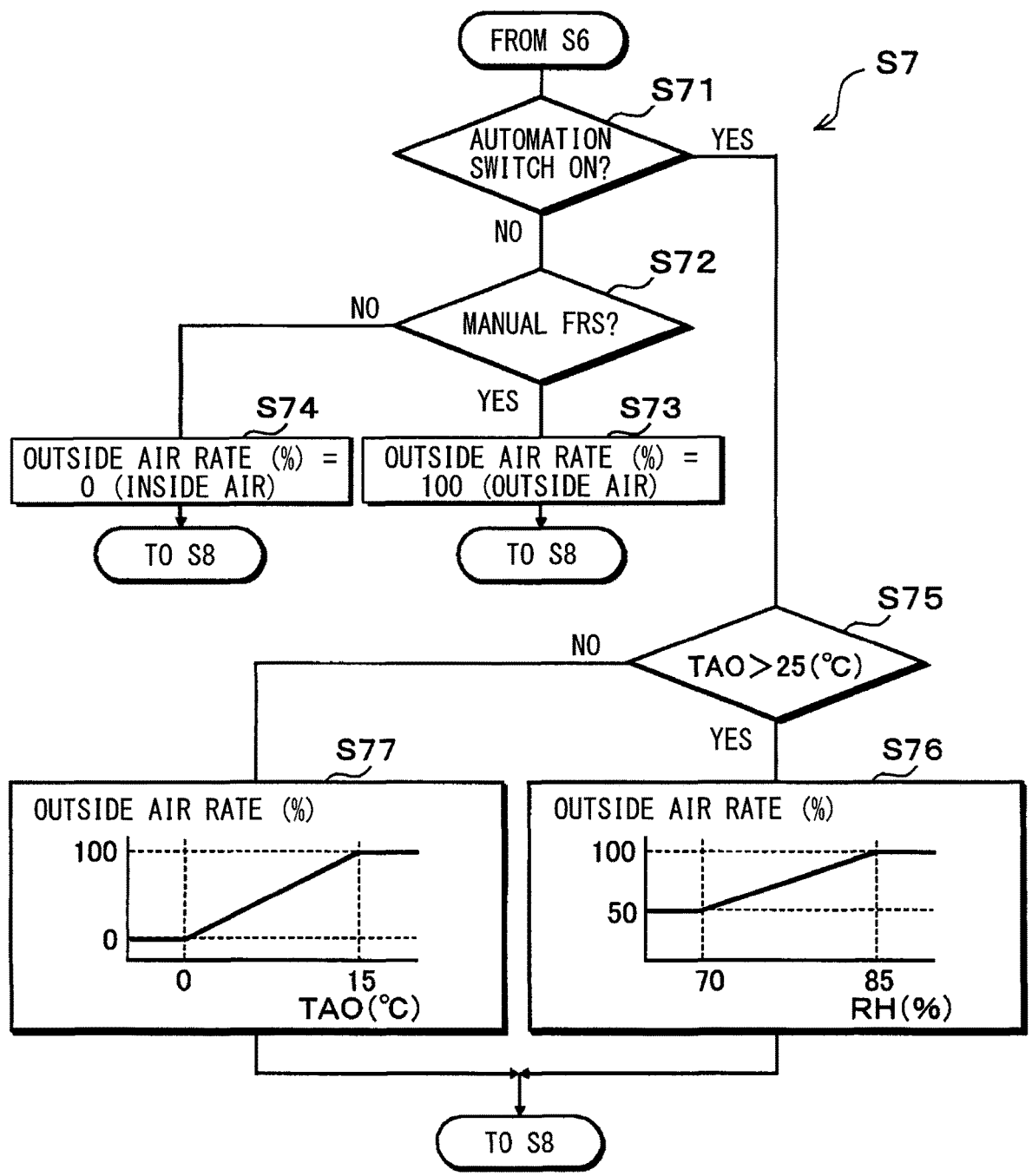
FIG. 6 is a flowchart illustrating a control process for determining a suction port mode in the control process of the air-conditioning controller of the embodiment.

In the control map, as shown in a control characteristic diagram described in step S76 of FIG. 6, the outside air rate is increased with a rise in the near-window humidity RH. More specifically, in the present embodiment, the outside air rate is set to 50% when RH≤70% and set to 100% when RH≥85%. In the range of 50%<RH<85%, the outside air rate is increased with a rise in the near-window humidity RH.

Accordingly, as the rear-window humidity increases, the introduction rate of outside air is increased to reduce the humidity in the vehicle compartment interior space to prevent window fogging.

When the TAO is equal to or lower than 25° C. in step S75, it is determined that the cooling operation is being performed, and the process proceeds to step S77. In step S77, the outside air rate is determined on the basis of the target blowing temperature TAO with reference to a control map which is previously stored in the air-conditioning controller 50. Then, the process proceeds to step S8.

In the control map, as shown in a control characteristic diagram described in step S77 of FIG. 6, the outside air rate is increased with a rise in the target blowing temperature TAO. More specifically, in the present embodiment, the outside air rate is set to 0% when TAO≤0° C. and set to 100% when TAO≧15° C. In the range of 0° C.<TAO<15° C., the outside air rate is increased with a rise in the target blowing temperature TAO.

Accordingly, as the target blowing temperature TAO decreases (that is, as the cooling load increases), the introduction rate of inside air is increased to improve the cooling efficiency.

Next, in step S8, the blowing port mode is determined. More specifically, a control signal output to the electric actuator 64 for the blowing port mode doors is determined. The details of step S8 will be described with reference to the flowchart of FIG. 7.

First, in step S81, it is determined whether the automation switch of the operation panel 60 is on. When it is determined that the automation switch is not on, the process proceeds to step S82. In step S82, the blowing port mode is determined to a blowing port mode set by a manual operation using the blowing port mode selector switch of the operation panel 60. Then, the process proceeds to step S9.

On the other hand, when it is determined that the automation switch of the operation panel 60 is on in step S81, the process proceeds to step S83. In step S83, a provisional blowing port mode is determined on the basis of the target blowing temperature TAO with reference to a control map which is previously stored in the air-conditioning controller 50.

Figure 7:
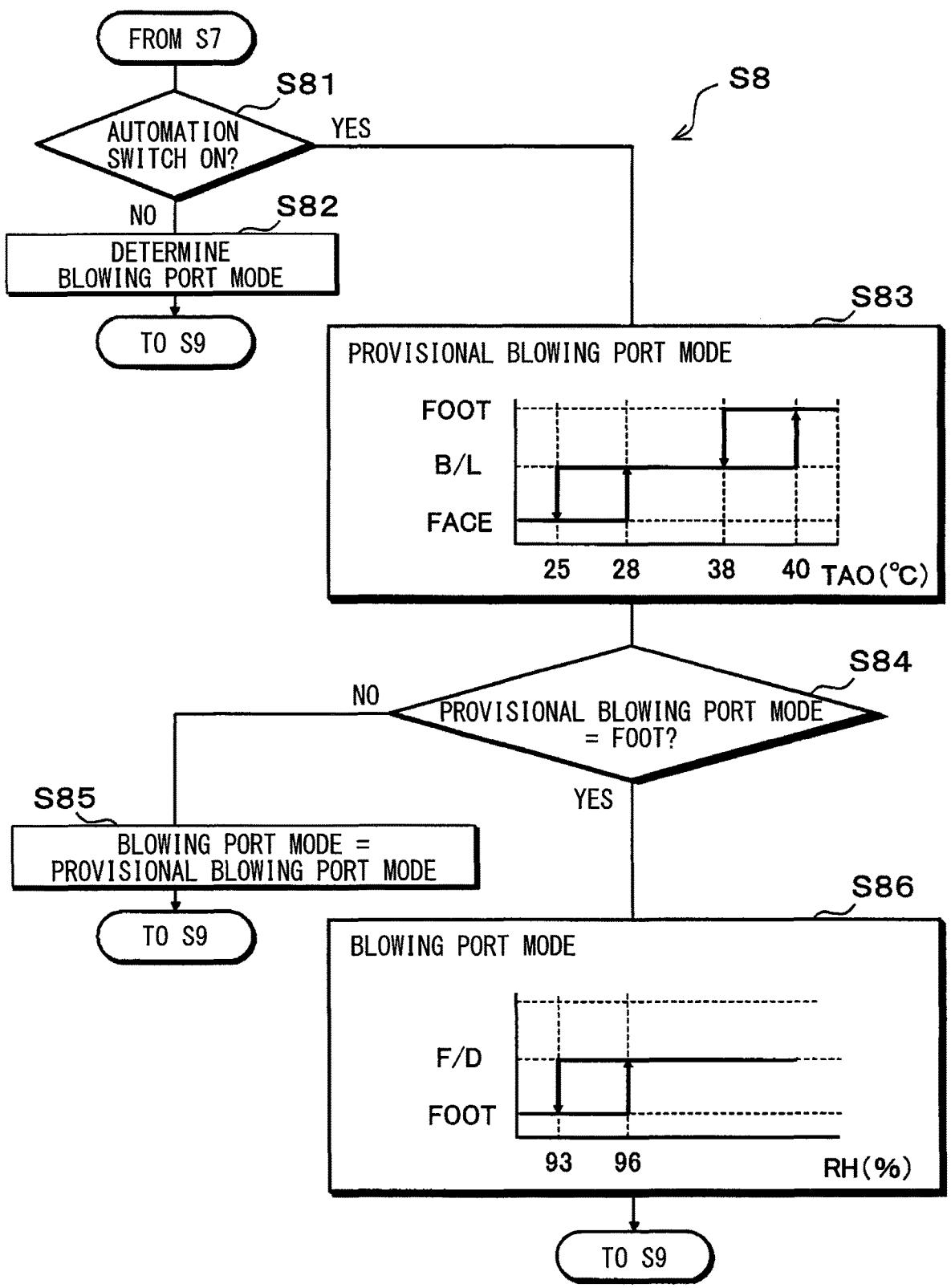
FIG. 7 is a flowchart illustrating a control process for determining a blowing port mode in the control process of the air-conditioning controller of the embodiment.
Figure 8:
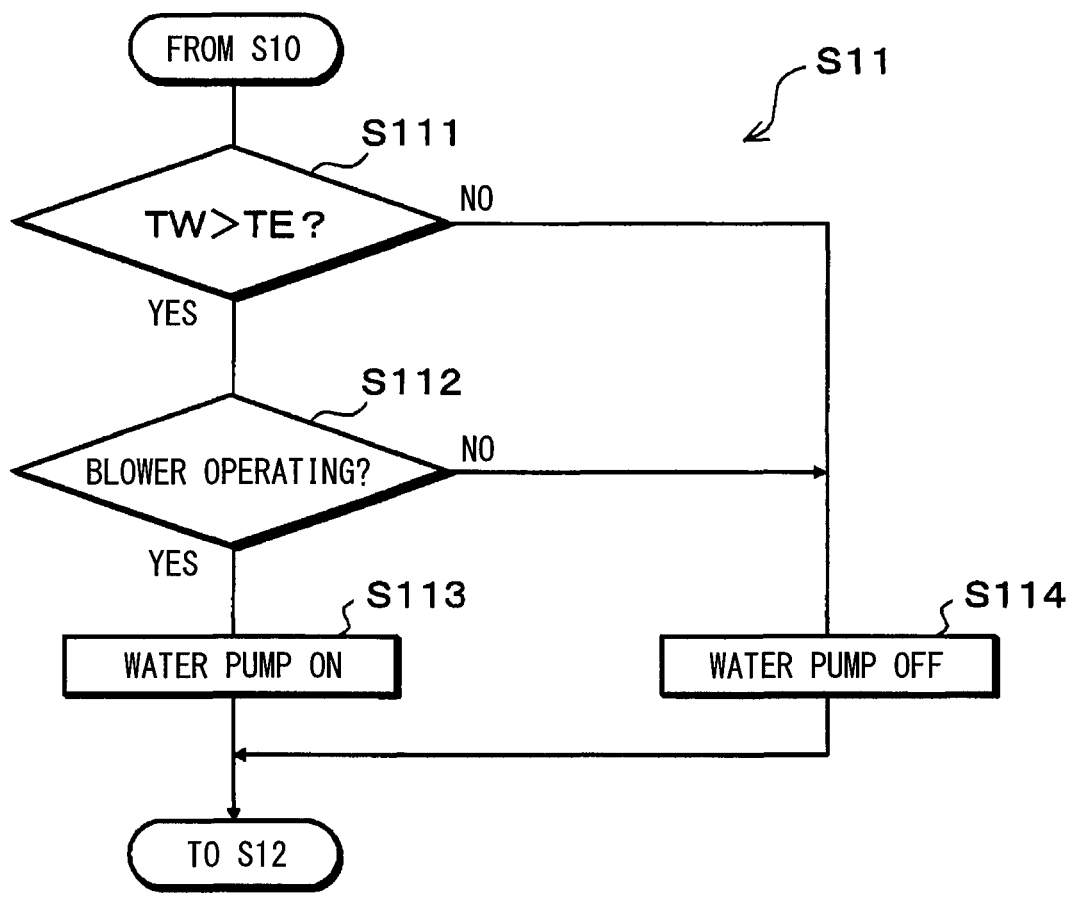
FIG. 8 is a flowchart illustrating a control process for determining an operation state of a water pump in the control process of the air-conditioning controller of the embodiment.

In the control map, as shown in a control characteristic diagram described in step S83 of FIG. 7, the provisional blowing port mode is sequentially switched to the face mode (described as FACE in FIG. 7), the bi-level mode (described as B/L in FIG. 7), and the foot mode (described as FOOT in FIG. 7) in this order with a rise in the TAO from the low temperature range to the high temperature range.

Thus, the face mode, the bi-level mode, and the foot mode are more likely to be mainly selected in summer, spring and autumn, and winter, respectively.

In the following step S84, it is determined whether the provisional blowing port mode is the foot mode. When it is determined that the provisional blowing port mode is not the foot mode at step S84, the process proceeds to step S85. In step S85, the blowing port mode is determined to the provisional blowing port mode determined in step S83. Then, the process proceeds to step S9.

On the other hand, when it is determined that the provisional blowing port mode is the foot mode at step S84, the process proceeds to step S86. In step S86, the blowing port mode is determined on the basis of the near-window humidity RH with reference to a control map which is previously stored in the air-conditioning controller 50. Then, the process proceeds to step S9.

In the control map, as shown in a control characteristic diagram described in step S86 of FIG. 7, the blowing port mode is set to the foot mode when the near-window humidity RH is lower than a reference humidity predetermined value and set to the foot defroster mode (described as F/D in FIG. 7) when the near-window humidity is higher than the predetermined value. In each of the control characteristic diagrams described in steps S83, S86 of FIG. 7, a hysteresis width for preventing control hunting is set.

Next, in step S9, a request signal output from the air-conditioning controller 50 to the driving force controller 70 is determined. The request signal includes an operation request signal operating the engine EG in a stopped state and a switching request signal requesting switching between the EV traveling mode and the HV traveling mode.

In a common vehicle which obtains the driving force for vehicle traveling only from the engine EG, the engine is continuously operated during traveling. Thus, the temperature of a coolant is constantly high. Thus, in a common vehicle, a sufficient heating capacity can be exhibited by circulating a coolant through the heater core 36.

On the other hand, in the plug-in hybrid vehicle of the present embodiment, the driving force for vehicle traveling can be obtained also from the traveling electric motor, and the operation of the engine EG may thus be stopped. Thus, when heating inside the vehicle compartment is performed in the vehicular air-conditioning device 1, the temperature of the coolant may not rise up to a temperature that is sufficient as a heat source for heating.

Thus, when a predetermined condition is satisfied even under a traveling condition where it is not necessary to operate the engine EG for outputting the driving force for traveling, the vehicular air-conditioning device 1 of the present embodiment outputs a request signal requesting the operation of the engine EG to the driving force controller 70, which controls the driving force of the engine EG, to raise the coolant temperature up to a temperature sufficient as the heat source for heating.

Next, in step S10, a heating capacity of the PTC heater 37 is determined. More specifically, the number of PTC elements energized is determined. In step S10, the number of PTC elements energized is determined according to the outside air temperature Tam, the provisional air mix opening degree SWdd, and the coolant temperature TW.

More specifically, in the present embodiment, when the outside air temperature Tam is equal to or lower than a reference outside air temperature (26° C. in the present embodiment) and the provisional air mix opening degree SWdd is equal to or higher than a reference opening degree (100% in the present embodiment), the number of PTC elements energized is increased with a drop in the coolant temperature TW.

Accordingly, when the outside air temperature Tam is relatively low, and blown air thus cannot be sufficiently heated even when the air mix door 39 is displaced to the maximum heating position, the PTC heater 37 is operated as an auxiliary heating device.

Next, in step S11, it is determined whether to operate the coolant pump 40a of the coolant circuit 40. The details of step S11 will be described with reference to the flowchart of FIG. 8. First, in step S111, it is determined whether the coolant temperature TW is higher than the blown air temperature TE of air blown from the evaporator 15.

When the coolant temperature TW is equal to or lower than the blown air temperature TE in step S111, the process proceeds to step S114, and the coolant pump 40a is stopped because of the following reason. When the coolant with the coolant temperature TW equal to or lower than the blown air temperature TE flows to the heater core 36, the coolant flowing through the heater core 36 cools air that has passed through the evaporator 15, which reduces the temperature of air blown into the vehicle compartment on the contrary.

On the other hand, when the coolant temperature TW is higher than the blown air temperature TE in step S111, the process proceeds to step S112. In step S112, it is determined whether the blower 32 is operating. When it is determined that the blower 32 is not operating in step S112, the process proceeds to step S114. In step S114, stopping the coolant pump 40a is determined to save power. Then, the process proceeds to step S12.

When it is determined that the blower 32 is operating in step S112, the process proceeds to step S113. In step S113, operating the coolant pump 40a is determined. Then, the process proceeds to step S12. Accordingly, the coolant pump 40a is operated, and the coolant circulates within the coolant circuit. Thus, it is possible to perform heat exchange between the coolant flowing through the heater core 36 and air passing through the heater core 36 to heat the blown air.

Next, in step S12, an area where air conditioning is performed (that is, the air-conditioning zone) is determined. The details of step S12 will be described with reference to the flowchart of FIG. 9.

First, in step S121, it is determined whether the air-conditioning mode is the zone air-conditioning mode. As described above, in the present embodiment, the air-conditioning mode is changed to the zone air-conditioning mode when the IG switch is turned on. However, when the rear seat storage flag RSf is 0, the zone air conditioning is determined to be unnecessary, and the air-conditioning mode is changed to the all-seat air-conditioning mode.

Then, when it is determined that the air-conditioning mode is not the zone air-conditioning mode in step S121, the process proceeds to step S13. On the other hand, when it is determined that the air-conditioning mode is the zone air-conditioning mode in step S121, the process proceeds to step S122.

In step S122, it is determined whether the front passenger seat is occupied by an occupant on the basis of a detection signal of the front passenger seat side seat sensor 75. Then, when it is determined at step S122 that the front passenger seat is unoccupied by an occupant, the process proceeds to step S123. In step S123, the air-conditioning zone is determined on the basis of the target blowing temperature TAO with reference to a control map which is previously stored in the air-conditioning controller 50.

Figure 9:
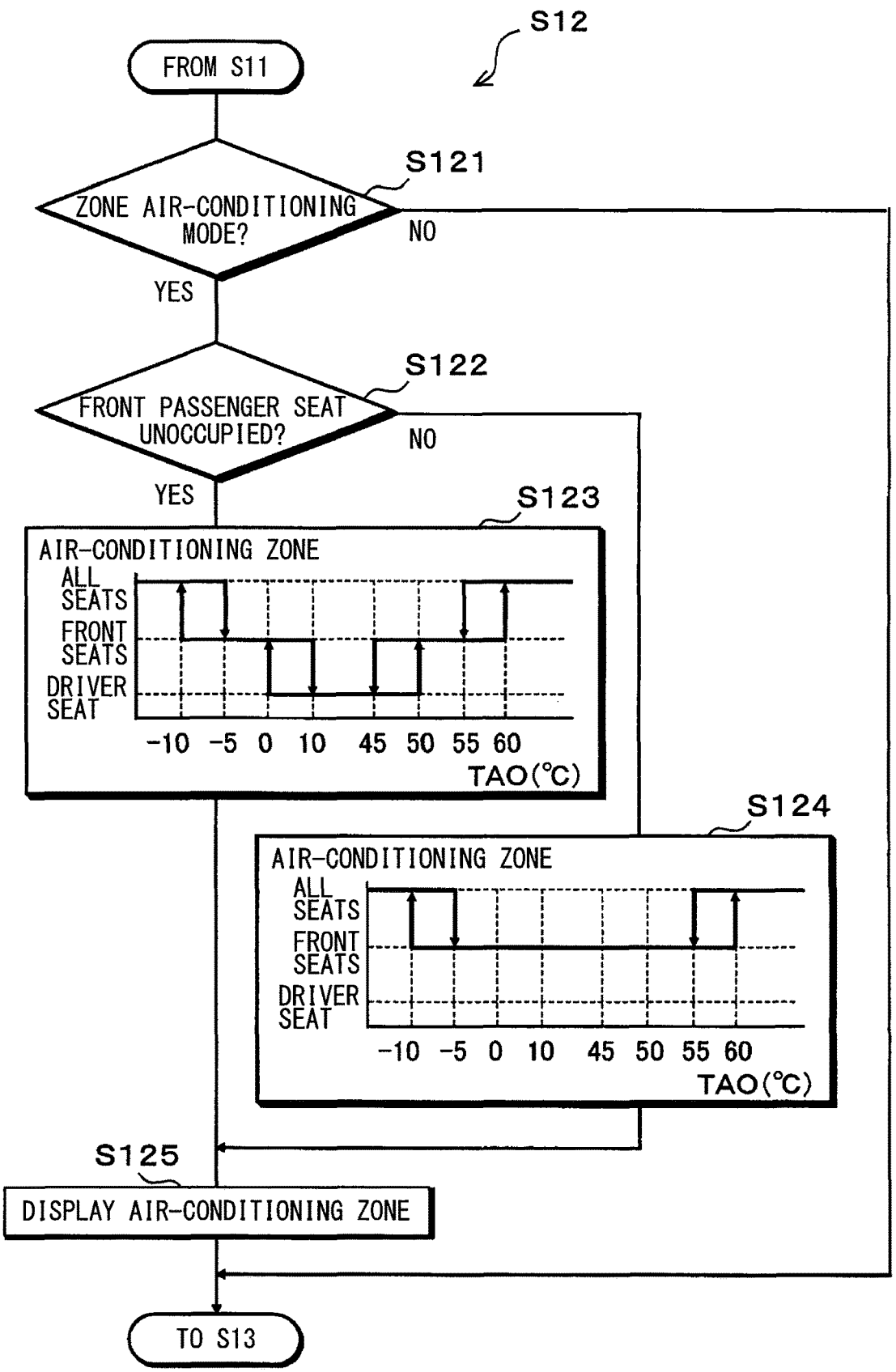
FIG. 9 is a flowchart illustrating a control process for determining a zone where air conditioning is performed in the control process of the air-conditioning controller of the embodiment.
Figure 10:
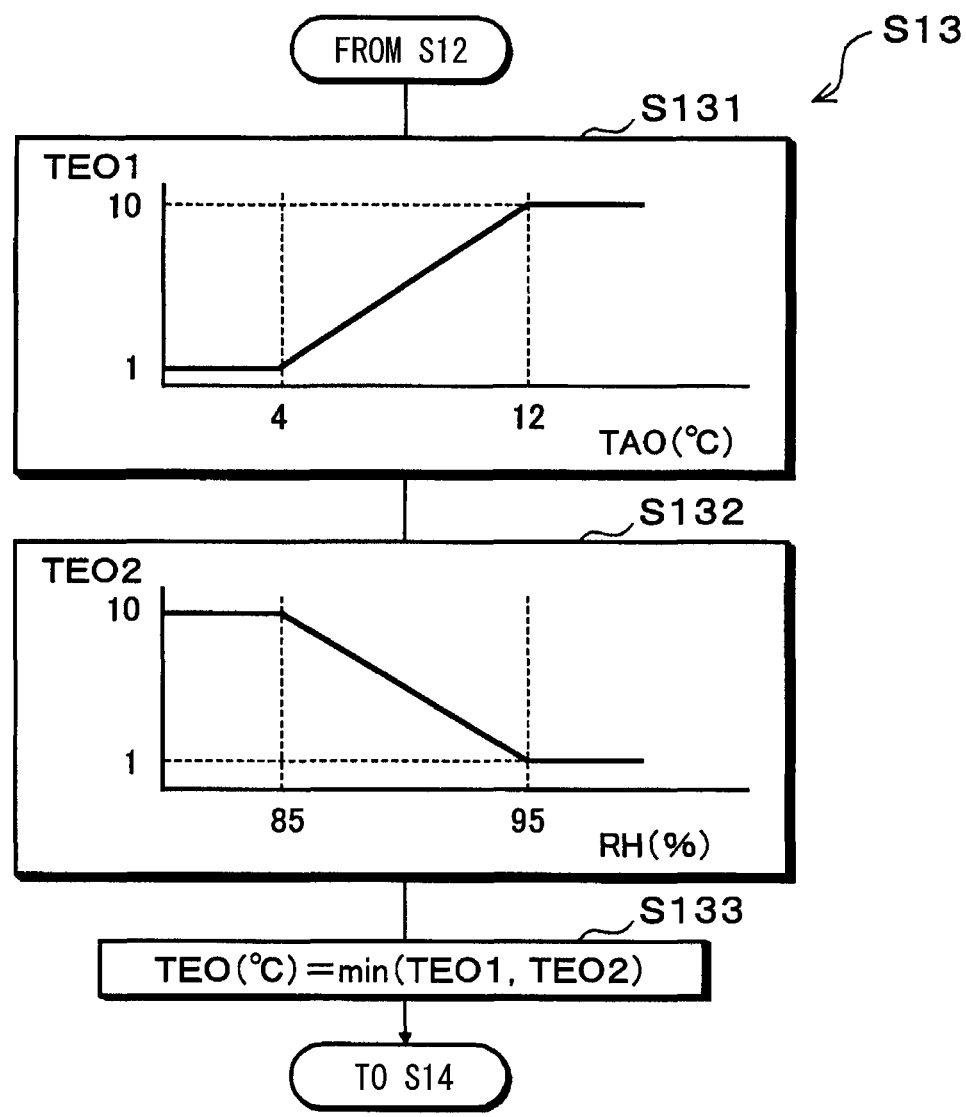
FIG. 10 is a flowchart illustrating a control process for determining a target evaporator temperature in the control process of the air-conditioning controller of the embodiment.

In the control map, as shown in a control characteristic diagram described in step S123 of FIG. 9, the air-conditioning zone is set to all the seats (that is, the driver seat area, the front passenger seat area, and the rear seat area) in an extremely low temperature range (e.g., −10° C. or lower) and an extremely high temperature range (e.g., 60° C. or higher) of the TAO. In a range in which the TAO approaches an intermediate temperature range (e.g., 0≤TAO≤50) from the maximum cooling range or the maximum heating range, the air-conditioning zone is set to the front seats (that is, the driver seat area and the front passenger seat area). When the TAO falls into the intermediate temperature range, the air-conditioning zone is set to the driver seat (that is, the driver seat area).

In an air-conditioning transition period in which the TAO falls within the extremely low temperature range or the extremely high temperature range, it is possible to promptly regulate the temperature inside the vehicle compartment to achieve air conditioning having a prompt effect by setting the air-conditioning zone to all the seats like the control map of the present embodiment. In an air-conditioning stationary state in which the TAO falls within the intermediate temperature range, energy saving in the vehicular air-conditioning device 1 can be achieved by performing air conditioning only in the driver seat occupied by an occupant.

When the air conditioning zone is set to the front seats, the rear open hole 27a is closed with the rear door 271. When the air conditioning zone is set to the driver seat, the rear open hole 27a is closed with the rear door 271, the front passenger seat side face open hole 24b is closed with the front passenger seat side face door 241b, and the front passenger seat side foot open hole 25b is closed with the front passenger seat side foot door 251b.

When it is determined that the front passenger seat is occupied by an occupant in step S122, the process proceeds to step S124. In step S124, the air-conditioning zone is determined on the basis of the target blowing temperature TAO with reference to a control map which is previously stored in the air-conditioning controller 50.

In the control map, as shown in a control characteristic diagram described in step S124 of FIG. 9, the air-conditioning zone is set to all the seats in the extremely low temperature range and the extremely high temperature range of the TAO. When the TAO falls within the range in which the TAO approaches the intermediate temperature range from the maximum cooling range or the maximum heating range and the intermediate temperature range, the air-conditioning zone is set to the front seats. In each of the control characteristic diagrams illustrated in steps S123, S124 of FIG. 9, a hysteresis width for preventing control hunting is set.

In step S125 following steps S123, S124, information indicating that the zone air conditioning is being executed and information relating to an area where the zone air conditioning is being executed are displayed on the display unit of the operation panel 60. Then, the process proceeds to step S13.

Next, in step S13, a target evaporator temperature TEO is determined. The target evaporator temperature TEO is a target value of a refrigerant evaporation temperature in the evaporator 15. The details of step S13 will be described with reference to the flowchart of FIG. 10.

First, in step S131, a first provisional target evaporator temperature TEO1 is determined on the basis of the target blowing temperature TAO with reference to a control map which is previously stored in the air-conditioning controller 50. In the control map, as shown in a control characteristic diagram described in step S131 of FIG. 10, the first provisional target evaporator temperature TEO1 is raised with a rise in the TAO.

In the following step S132, a second provisional target evaporator temperature TEO2 is determined on the basis of the near-window humidity RH with reference to a control map which is previously stored in the air-conditioning controller 50. In the control map, as shown in a control characteristic diagram described in step S132 of FIG. 10, the second provisional target evaporator temperature TEO2 is lowered with a rise in the RH.

In the following step S133, a value of the smaller one of the first provisional target evaporator temperature TEO1 and the second provisional target evaporator temperature TEO2 is determined as the target evaporator temperature TEO. Then, the process proceeds to step S14. Accordingly, dehumidification of blown air can be performed by lowering the target evaporator temperature TEO with a rise in the near-window humidity RH. Thus, it is possible to effectively reduce fogging of the vehicle window glass.

Next, in step S14, the refrigerant discharge capacity of the compressor 11 is determined. More specifically, the rotation speed of the compressor 11 is determined. The determination of the compressor rotation speed in step S14 is performed not every control period T in which the main routine of FIG. 3 is repeated, but every predetermined control interval (one second in the present embodiment).

Figure 11:
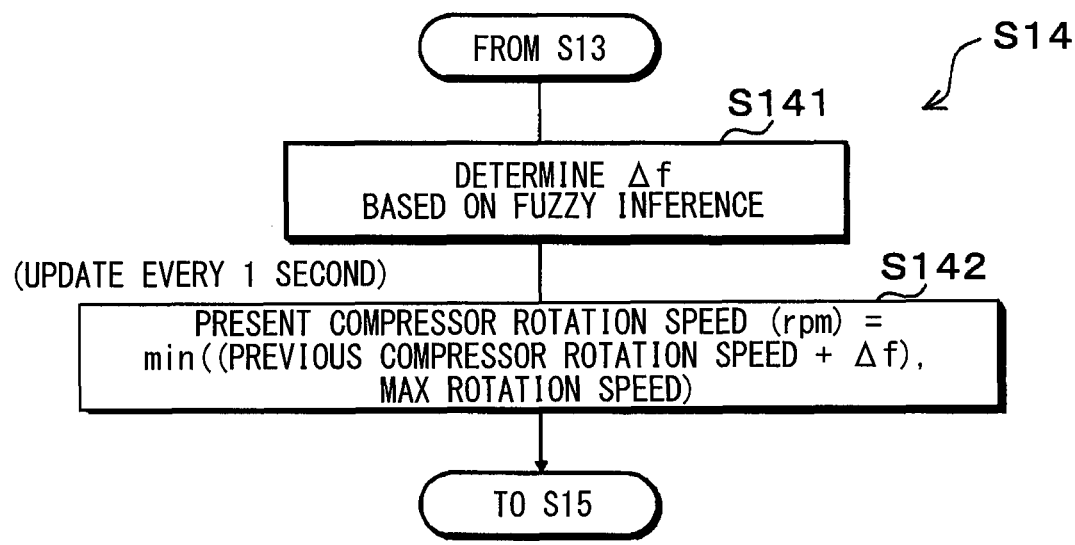
FIG. 11 is a flowchart illustrating a control process for determining a rotation speed of a compressor in the control process of the air-conditioning controller of the embodiment.

The details of step S14 will be described with reference to the flowchart of FIG. 11. First, in step S141, a rotation speed change amount $\Delta f$ with respect to a previous compressor rotation speed fn−1 is obtained.

Specifically, a deviation En (TEO−TE) between the target blowing temperature TEO and the blown air temperature TE is calculated. Then, a deviation change rate Edot (En−(En−1)) is calculated by subtracting a deviation En−1 which is calculated last time from the deviation En which is calculated this time. Then, using the deviation En and the deviation change rate Edot, the rotation speed change amount Δf with respect to the previous compressor rotation speed fn−1 is obtained on the basis of the fuzzy inference based on a membership function and a rule which are previously stored in the air-conditioning controller 50.

In the following step S142, the present compressor rotation speed is calculated by the following formula F3.

$$\text{Present compressor rotation speed}=\text{MIN}\{(\text{previous compressor rotation speed}+\Delta f), \text{MAX rotation speed}\} \quad (F3)$$

In formula F3, "MIN {(previous compressor rotation speed+Δf, MAX rotation speed}" represents a value of the smaller one of "previous compressor rotation speed+Δf" and "MAX rotation speed". In the present embodiment, the MAX rotation speed is 10,000 rpm.

Next, in step S15, the air-conditioning controller 50 outputs a control signal and a control voltage to the various devices 12a, 32, 37, 40a, 61, 62, 63, 64 so that the control state determined in steps S5 to S14 described above can be obtained. Further, the air-conditioning controller 50 transmits the request signal determined in step S11 to the driving force controller 70.

Next, the process is kept on standby for the control period T in step S16 and returns to step S2 when an elapse of the control period T is determined. In the present embodiment, the control period T is set to 250 ms because a control period longer than that of engine control does not adversely affect the controllability of the air-conditioning control inside the vehicle compartment.

Accordingly, it is possible to reduce the amount of communication for the air-conditioning control inside the vehicle compartment to secure a sufficient communication amount for a control system that requires high-speed control such as engine control.

The vehicular air-conditioning device 1 of the present embodiment operates as described above. Thus, air blown from the blower 32 is cooled in the evaporator 15. Then, the cool air cooled in the evaporator 15 flows into the cool air heating passage 33 and the cool air bypass passage 34 according to the opening degree of the air mix door 39.

The cool air flowing into the cool air heating passage 33 is heated while passing through the heater core 36 and the PTC heater 37 and mixed with the cool air that has passed through the cool air bypass passage 34 in the mixing space 35. Then, the air-conditioning air whose temperature has been regulated in the mixing space 35 is blown into the vehicle compartment from the mixing space 35 through each of the blowing ports.

When air inside the vehicle compartment is cooled by the air-conditioning air blown into the vehicle compartment, cooling inside the vehicle compartment is realized. One the other hand, air inside the vehicle compartment is heated by the air-conditioning air, heating inside the vehicle compartment is realized.

In a vehicular air-conditioning device capable of realizing zone air conditioning like the vehicular air-conditioning device 1 of the present embodiment, energy saving in the entire vehicular air-conditioning device 1 can be achieved by performing air conditioning in an area occupied by an occupant without performing air conditioning in an area unoccupied by an occupant.

However, in a vehicle in which no seat sensor is disposed on a rear seat like the vehicle in the present embodiment, it is not possible to determine whether the rear seat is occupied by an occupant on the basis of a detection value of a seat sensor. Further, even if a seat sensor is disposed on a rear seat, it may be impossible to correctly detect the seating position of an occupant when a light-weighted child is seated or a child safety seat is placed on the rear seat.

Thus, in a vehicular air-conditioning device applied to a vehicle in which no seat sensor is disposed on a rear seat, it is difficult to realize appropriate zone air conditioning in a rear seat area.

On the other hand, the air-conditioning controller 50 of the vehicular air-conditioning device 1 of the present embodiment is activated by an activation signal which is output from the body controller 71 when the rear seat door is opened and closed during a stop of the vehicle system. Thus, in the vehicular air-conditioning device 1 of the present embodiment, it is possible to detect whether the rear seat is occupied by an occupant by opening and closing of the rear seat door during a stop of the vehicle system.

Further, erroneous detection that may occur in a configuration that detects the seating position of an occupant using a seat sensor does not occur. As a result, according to the vehicular air-conditioning device 1 of the present embodiment, it is possible to realize appropriate zone air conditioning in the rear seat area.

The air-conditioning controller 50 of the present embodiment is activated when the rear seat door is opened and closed. Thus, it is possible to prevent the air-conditioning controller 50 from consuming unnecessary power during a stop of the vehicle system. In addition, it is possible to prevent the state of charge of the battery 81 from becoming zero during a stop of the vehicle system.

In addition, it is possible to activate the air-conditioning controller 50 prior to turning-on of the IG switch. Thus, it is possible to promptly start air conditioning in an area including the rear seat area after the activation of the vehicle system.

More specifically, in a configuration like the vehicle of the present embodiment in which a plurality of controllers such as the air-conditioning controller 50, the driving force controller 70, and the body controller 71 are communicably connected by the multiplex communication system, a rise time of approximately 5 seconds to 10 seconds is typically required until the communication between the controllers 50, 70, 71 is completely established after turning-on of the IG switch.

On the other hand, when the air-conditioning controller 50 is already active when the IG switch is turned on like the vehicular air-conditioning device 1 of the present embodiment, it is possible to realize zone air conditioning having a high energy saving effect immediately after the IG switch is turned on.

In the vehicular air-conditioning device 1 of the present embodiment, the air-conditioning controller 50 is activated at least when the rear seat door is opened and closed during a stop of the vehicle system and the opening time OTm of the rear seat door is equal to or longer than the reference opening time KOTm. Thus, it is possible to prevent erroneous detection that the rear seat is occupied by an occupant when the rear seat door is opened and closed for carrying-in or carrying-out of baggage.

In the vehicular air-conditioning device 1 of the present embodiment, the air-conditioning controller 50 is stopped when the air-conditioning controller 50 is in an activated state by opening and closing of the rear seat door and the standby time WTm becomes equal to or longer than the reference standby time KWTm before the IG switch is turned on. Accordingly, it is possible to prevent the air-conditioning controller 50 from consuming unnecessary power when the rear seat is unoccupied by an occupant.

In the vehicular air-conditioning device 1 of the present embodiment, the air-conditioning controller 50 is set to the zone air-conditioning mode when the IG switch is turned on. Thus, even when an occupant has performed switching to the all-seat air-conditioning mode in the previous traveling, a higher priority can be given to the zone air conditioning than to the all-seat air conditioning in the current traveling. Thus, an energy saving effect can be obtained.

In the vehicular air-conditioning device 1 of the present embodiment, information indicating that the zone air conditioning is being executed and information relating to an area where the zone air conditioning is being executed can be displayed on the display unit of the operation panel 60. Thus, the execution of the zone air conditioning can be recognized by an occupant immediately after the IG switch is turned on. Accordingly, it is possible to improve a feeling of satisfaction of an occupant who has high awareness of environmental protection.

The present disclosure is not limited to the above embodiment and can be modified in various manners as described below without departing from the gist of the present disclosure.

The above embodiment describes an example in which the blowing port mode doors 241a to 271 are operated to regulate the volume of air-conditioning air blown to the front passenger seat area and the rear seat area to realize the zone air conditioning. However, the zone air conditioning of the vehicular air-conditioning device according to the present disclosure is not limited thereto.

For example, the air passage on the downstream side of the evaporator 15 inside the casing 31 may be partitioned into a driver seat air passage, a front passenger seat air passage, and a rear seat air passage, and a dedicated air mix door may be disposed inside each of the air passages. Accordingly, it is possible to regulate not only the volume of air-conditioning air blown to the driver seat area, the front passenger seat area, and the rear seat area, but also temperature independently between the areas.

The above embodiment describes an example in which the zone air conditioning is performed in the rear seat area which is defined as a single area. However, the rear seat area may be divided into a right area and a left area. Further, a right door open-closed sensor and a left door open-closed sensor may be provided as the rear seat door open-closed sensor.

The air-conditioning controller 50 may be activated when opening and closing of at least either one of a right rear seat door or a left rear seat door, which are used for getting on or out of the rear seat area is performed during a stoppage of the vehicle system.

Further, the air-conditioning controller 50 may control the operation of the air volume regulator (blowing port mode door) so that air-conditioning air is blown to the right area when the activation switch of the vehicle system is turned on in a state where the air-conditioning controller 50 has been activated by the opening and closing of the right rear seat door and may control the operation of the air volume regulator (blowing port mode door) so that air-conditioning air is blown to the left area when the activation switch of the vehicle system is turned on in a state where the air-conditioning controller 50 has been activated by the opening and closing of the left rear seat door.

In the above embodiment, as described in step S12 of the control process executed by the air-conditioning controller 50, when the rear seat storage flag RSf is 0 when the IG switch is turned on, the air-conditioning mode is switched to the all-seat air-conditioning mode. However, the present disclosure is not limited thereto.

For example, when the rear seat storage flag RSf is 0 when the IG switch is turned on, it may be determined that the rear seat is unoccupied by an occupant, and zone air conditioning that blows air-conditioning air only to the front seats (that is, the driver seat area and the front passenger seat area) may be performed. That is, zone air conditioning that blows air-conditioning air only to the driver seat area and zone air conditioning that blows air-conditioning air to both of the driver seat area and the front passenger seat area may be switched.

The above embodiment describes an example in which the vehicular air-conditioning device 1 of the present disclosure is applied to the plug-in hybrid vehicle. However, the application of the present disclosure is not limited thereto. For example, the vehicular air-conditioning device 1 of the present disclosure may be applied to a common vehicle which obtains the driving force for vehicle traveling from an internal combustion engine (engine) to travel or an electric vehicle (including a fuel cell vehicle) which obtains the driving force from a traveling electric motor to travel.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle system comprising:
a vehicular air-conditioning device being capable of realizing air conditioning of a part of an area inside a vehicle compartment, the area including multiple areas including at least a rear seat area, the vehicular air-conditioning device includes:
an air volume regulator configured to regulate a volume of air-conditioning air blown to each of the areas; and
an air-conditioning controller configured to control an operation of the air volume regulator; and
a body controller operating during a stoppage of the vehicle system, the body controller being connected to a rear seat door open-closed sensor that detects opening and closing of a rear seat door which is used for getting in or out of the rear seat area, wherein
the air-conditioning controller is activated by an activation signal from the body controller at least in response to the body controller detecting the opening and closing of the rear seat door during the stoppage of the vehicle system, and
the air-conditioning controller controls the operation of the air volume regulator to blow the air-conditioning air to the rear seat area when an activation switch of the vehicle system is turned on in a state where the air-conditioning controller has been activated by the opening and closing of the rear seat door.

2. The vehicle system according to claim 1, wherein
the air-conditioning controller is deactivated when a standby time elapsed since the opening of the rear seat door becomes equal to or longer than a predetermined reference standby time in the state where the air-conditioning controller has been activated by the opening and closing of the rear seat door before the activation switch is turned on.

3. The vehicle system according to claim 1, wherein the air-conditioning controller is activated when an opening time of the rear seat door is equal to or longer than a predetermined reference opening time.

4. The vehicle system according to claim 1, wherein the air-conditioning controller is configured to switch between a zone air-conditioning mode that performs air conditioning of at least a part of the multiple areas and an all-seat air-conditioning mode that performs air conditioning of all the areas inside the vehicle compartment, and
the air-conditioning controller is switched to the zone air-conditioning mode when the activation switch is turned on.

5. The vehicle system according to claim 1, wherein the air-conditioning controller and the body controller are communicably connected by a multiplex communication system.

6. A vehicular air-conditioning device capable of realizing air conditioning of a part of an area inside a vehicle compartment, the area including multiple areas including at least a rear seat area, the vehicular air-conditioning device comprising:
an air volume regulator configured to regulate a volume of air-conditioning air blown to each of the areas; and
an air-conditioning controller configured to control an operation of the air volume regulator, wherein
the air-conditioning controller is activated at least when opening and closing of a rear seat door used for getting in or out of the rear seat area are performed during a stoppage of a vehicle system,
the air-conditioning controller controls the operation of the air volume regulator to blow the air-conditioning air to the rear seat area when an activation switch of the vehicle system is turned on in a state where the air-conditioning controller has been activated by the opening and closing of the rear seat door, and
the air-conditioning controller is activated at least when the opening and closing of the rear seat door used for getting in or out of the rear seat area are performed during a stoppage of the vehicle system and an opening time of the rear seat door is equal to or longer than a predetermined reference opening time.

7. A vehicular air-conditioning device capable of realizing air conditioning of a part of an area inside a vehicle compartment, the area including multiple areas including at least a rear seat area, the vehicular air-conditioning device comprising:
an air volume regulator configured to regulate a volume of air-conditioning air blown to each of the areas; and
an air-conditioning controller configured to control an operation of the air volume regulator, wherein
the air-conditioning controller is activated at least when opening and closing of a rear seat door used for getting in or out of the rear seat area are performed during a stoppage of a vehicle system,
the air-conditioning controller controls the operation of the air volume regulator to blow the air-conditioning air to the rear seat area when an activation switch of the vehicle system is turned on in a state where the air-conditioning controller has been activated by the opening and closing of the rear seat door,
the air-conditioning controller is configured to switch between a zone air-conditioning mode that performs air conditioning of at least a part of the multiple areas and an all-seat air-conditioning mode that performs air conditioning of all the areas inside the vehicle compartment, and
the air-conditioning controller is switched to the zone air-conditioning mode when the activation switch is turned on.

* * * * *